US010185995B2

(12) United States Patent
Bartko et al.

(10) Patent No.: US 10,185,995 B2
(45) Date of Patent: Jan. 22, 2019

(54) SYSTEM AND METHOD FOR MANAGING DISPLAY OF MARKET DATA IN AN ELECTRONIC TRADING SYSTEM

(75) Inventors: Peter Bartko, Warwick, NY (US); John Robert Capuano, Chatham, NJ (US); Michael Field, Essex (GB); Frederick T. Gregson, Red Bank, NJ (US); Brian Alexander Weston, Katonah, NY (US)

(73) Assignee: BGC PARTNERS, L.P., New York, NY (US)

( * ) Notice: Subject to any disclaimer, the term of this patent is extended or adjusted under 35 U.S.C. 154(b) by 870 days.

(21) Appl. No.: 11/623,733

(22) Filed: Jan. 16, 2007

(65) Prior Publication Data

US 2008/0172320 A1    Jul. 17, 2008

(51) Int. Cl.
*G06Q 40/06*    (2012.01)
*G06Q 30/06*    (2012.01)
*G06Q 40/04*    (2012.01)

(52) U.S. Cl.
CPC ............ *G06Q 40/06* (2013.01); *G06Q 30/06* (2013.01); *G06Q 40/04* (2013.01)

(58) Field of Classification Search
CPC ........ G06Q 40/04; G06Q 40/00; G06Q 40/12; G06Q 40/02; G06Q 40/06; G06Q 30/00; G06Q 30/04; G06Q 30/06
See application file for complete search history.

(56) References Cited

U.S. PATENT DOCUMENTS

| | | | |
|---|---|---|---|
| 5,924,082 A | 7/1999 | Silverman et al. | |
| 6,012,046 A | 1/2000 | Lupien et al. | |
| 6,098,051 A | 8/2000 | Lupien et al. | 705/37 |
| 6,125,355 A | 9/2000 | Bekaert et al. | 705/36 |
| 6,131,087 A | 10/2000 | Luke et al. | |
| 6,260,024 B1 | 7/2001 | Shkedy | 705/37 |
| 6,321,212 B1 | 11/2001 | Lange | 705/37 |
| 6,377,940 B2 | 4/2002 | Tilfors et al. | |

(Continued)

FOREIGN PATENT DOCUMENTS

| | | |
|---|---|---|
| JP | 2001-520421 | 10/2001 |
| JP | 2001-350955 | 12/2001 |

(Continued)

OTHER PUBLICATIONS

Integral Trading Corporation: Trading QuickStart—TheNFX Trades Trading Screen, 2003-2011, pp. 1-11, http://www.integralsupport.com/nfxtrades/download/NFX_Trading_QuickStart.pdf.*

(Continued)

*Primary Examiner* — Bijendra K Shrestha

(57) ABSTRACT

A system for managing trading orders comprises a memory operable to store a first order associated with a particular trading product, wherein the first order is associated with a first price comprising a first root value. The system further comprises a processor communicatively coupled to the memory and operable to receive a second order associated with the particular trading product. The second order is associated with a second price; and the second price comprises a second root value and a particular fractional pip value. The processor is further operable to disclose the first root value and the second root value while suppressing the particular fractional pip value.

20 Claims, 12 Drawing Sheets

(56) References Cited

U.S. PATENT DOCUMENTS

| | | | |
|---|---|---|---|
| 6,466,919 B1 | 10/2002 | Walker et al. | 705/37 |
| 6,536,935 B2 | 3/2003 | Parunak et al. | |
| 6,615,188 B1 | 9/2003 | Breen et al. | 705/37 |
| 6,882,985 B1 | 4/2005 | Kay et al. | 705/37 |
| 6,983,260 B2 | 1/2006 | Hummelgren | 705/37 |
| 7,035,819 B1 | 4/2006 | Gianakouros et al. | |
| 7,110,977 B2 | 9/2006 | Semret et al. | 705/37 |
| 7,127,424 B2* | 10/2006 | Kemp, II | G06Q 30/0275 |
| | | | 705/14.71 |
| 7,133,841 B1 | 11/2006 | Wurman et al. | 705/37 |
| 7,217,424 B2* | 5/2007 | Pereira | A61K 8/39 |
| | | | 424/401 |
| 7,249,086 B2 | 7/2007 | Bloom et al. | 705/37 |
| 7,539,638 B1 | 5/2009 | Keith | |
| 7,558,753 B2 | 7/2009 | Neubert et al. | |
| 7,769,652 B1 | 8/2010 | Monroe | |
| 7,882,011 B2* | 2/2011 | Sandhu | G06Q 30/02 |
| | | | 705/35 |
| 7,941,364 B2 | 5/2011 | Peterffy et al. | |
| 8,438,087 B2 | 5/2013 | Tanpoco | |
| 2001/0034696 A1 | 10/2001 | McIntyre | 705/37 |
| 2001/0037204 A1* | 11/2001 | Horn | G06Q 30/02 |
| | | | 705/309 |
| 2002/0007335 A1 | 1/2002 | Millard et al. | |
| 2002/0013757 A1 | 1/2002 | Bykowsky et al. | |
| 2002/0016759 A1 | 2/2002 | Macready et al. | 705/37 |
| 2002/0087457 A1 | 7/2002 | Madeley et al. | |
| 2002/0143689 A1 | 10/2002 | Naylor et al. | 705/37 |
| 2002/0184136 A1* | 12/2002 | Cleary Neubert | G06Q 30/06 |
| | | | 705/37 |
| 2002/0194107 A1 | 12/2002 | Li et al. | 705/37 |
| 2003/0018561 A1 | 1/2003 | Kitchen et al. | |
| 2003/0055775 A1 | 3/2003 | McQuain | 705/37 |
| 2003/0139998 A1 | 7/2003 | Gilbert et al. | 705/37 |
| 2003/0167219 A1 | 9/2003 | Quraishi et al. | 705/36 |
| 2003/0200167 A1 | 10/2003 | Kemp et al. | |
| 2004/0019554 A1* | 1/2004 | Merold | G06Q 40/04 |
| | | | 705/37 |
| 2004/0059668 A1 | 3/2004 | Togher et al. | |
| 2004/0111356 A1* | 6/2004 | Srivastava | G06Q 20/381 |
| | | | 705/37 |
| 2004/0177024 A1 | 9/2004 | Bok et al. | |
| 2004/0193519 A1* | 9/2004 | Sweeting | G06Q 40/00 |
| | | | 705/35 |
| 2004/0210511 A1 | 10/2004 | Waelbroeck et al. | |
| 2004/0236662 A1* | 11/2004 | Korhammer | G06Q 40/04 |
| | | | 705/37 |
| 2004/0254804 A1 | 12/2004 | Pererffy et al. | |
| 2005/0010537 A1 | 1/2005 | Ettinger | |
| 2005/0080734 A1 | 4/2005 | Lynch et al. | |
| 2005/0154668 A1 | 7/2005 | Burns et al. | |
| 2005/0187855 A1 | 8/2005 | Brennan et al. | |
| 2005/0203826 A1 | 9/2005 | Farrell et al. | 705/37 |
| 2005/0283422 A1* | 12/2005 | Myr | G06Q 20/381 |
| | | | 705/37 |
| 2005/0283427 A1 | 12/2005 | Owens et al. | |
| 2006/0015436 A1 | 1/2006 | Burns et al. | 705/37 |
| 2006/0015441 A1 | 1/2006 | Burkhardt et al. | 705/37 |
| 2006/0059079 A1* | 3/2006 | Howorka | G06Q 20/102 |
| | | | 705/37 |
| 2006/0106714 A1* | 5/2006 | Goldberg | G06Q 30/06 |
| | | | 705/37 |
| 2006/0136326 A1 | 6/2006 | Heckman et al. | 705/37 |
| 2006/0167783 A1* | 7/2006 | Riseman | G06Q 30/08 |
| | | | 705/37 |
| 2006/0173693 A1 | 8/2006 | Arazi et al. | |
| 2006/0229959 A1 | 10/2006 | Heidingsfeld et al. | 705/35 |
| 2006/0229967 A1 | 10/2006 | Sweeting | |
| 2006/0253380 A1 | 11/2006 | Adcock et al. | |
| 2006/0265296 A1 | 11/2006 | Glinberg et al. | 705/35 |
| 2006/0265309 A1 | 11/2006 | Sweeting et al. | |
| 2006/0265314 A1 | 11/2006 | Singer et al. | 705/37 |
| 2006/0218071 A1 | 12/2006 | Sweeting | |
| 2006/0294001 A1* | 12/2006 | Foster | G06Q 40/04 |
| | | | 705/37 |
| 2007/0043651 A1 | 2/2007 | Xiao et al. | |
| 2007/0055607 A1 | 3/2007 | Wunsch et al. | 705/37 |
| 2007/0061240 A1 | 3/2007 | Jain et al. | 705/37 |
| 2007/0061241 A1 | 3/2007 | Jovanovic et al. | |
| 2007/0100730 A1 | 5/2007 | Batashvili et al. | |
| 2007/0100734 A1 | 5/2007 | Berger et al. | |
| 2007/0112693 A1 | 5/2007 | Cushing | |
| 2007/0118453 A1* | 5/2007 | Bauerschmidt | G06Q 10/10 |
| | | | 705/36 R |
| 2007/0136183 A1 | 6/2007 | Roon | 705/37 |
| 2007/0208647 A1 | 9/2007 | Gemuenden et al. | |
| 2007/0219898 A1 | 9/2007 | Burkhardt et al. | |
| 2007/0244783 A1 | 10/2007 | Wright et al. | 705/35 |
| 2007/0250437 A1 | 10/2007 | Lejdstrom et al. | 705/37 |
| 2008/0172318 A1 | 7/2008 | Bartko et al. | |
| 2008/0172319 A1 | 7/2008 | Bartko et al. | |
| 2008/0172320 A1 | 7/2008 | Bartko et al. | |
| 2010/0228643 A1 | 9/2010 | Monroe | |
| 2012/0041866 A1 | 2/2012 | Glodjo et al. | |
| 2015/0026030 A1* | 1/2015 | Berger | G06Q 40/00 |
| | | | 705/37 |

FOREIGN PATENT DOCUMENTS

| | | |
|---|---|---|
| JP | 2002-175408 | 6/2002 |
| JP | 2002-203112 | 7/2002 |
| JP | 2002-358434 | 12/2002 |
| JP | 2003-30444 | 1/2003 |
| JP | 2004-528658 | 9/2004 |
| JP | 2006-505070 | 2/2006 |
| WO | WO/1999/019821 | 4/1999 |
| WO | WO/2000/021013 | 4/2000 |
| WO | WO/2002/097589 | 12/2002 |
| WO | WO/2004/042514 | 5/2004 |
| WO | WO/2006/047789 | 5/2006 |
| WO | WO/2006/127545 | 11/2006 |
| WO | WO 2007/030395 | 3/2007 |
| WO | WO-2008088947 A2 * | 7/2008 ............ G06Q 30/06 |

OTHER PUBLICATIONS

Integral Development Corporation: Trading QuickStart—TheNFX Trades Trading Screen, 2003-2011, pp. 1-11.*

Integral Development Corporation (IDC): Trading QuickStart—The NFX Trades Trading Screen, 2003-2011, pp. 1-11. (Year: 2011).*

Integral Development Corporation (IDC): Trading QuckStart—The NFX Trades Trading Screen, 2003-2011, pp. 1-11 (Year: 2003).*

InteractiveBrokers: Intermarket Sweep, Jun. 29, 2005, pp. 1-12. (Year: 2005).*

Burke et al.: Trading Forex with TradeStation, Jun. 15, 2001, pp. 1-47 (Year: 2001).*

Notification of Transmittal of the International Search Report and the Written Opinion of the International Searching Authority for International Application No. PCT/US08/50253; dated Jun. 1, 2009 (12 pages).

USPTO Office Action for U.S. Appl. No. 11/623,728, dated Oct. 21, 2008 (16 pages).

USPTO Office Action for U.S. Appl. No. 11/623,731, dated Nov. 12, 2008 (12 pages).

USPTO Office Action for U.S. Appl. No. 11/623,728, dated Aug. 6, 2009 (23 pages).

USPTO Office Action for U.S. Appl. No. 11/623,731, dated Jun. 9, 2009 (15 pages).

*Union Pac. Resources Co. v. Chesapeake Energy Corp.*, 236 F.3d 684, 692 (Fed. Cir. 2001).

*Orthokinetics, Inc. v. Safety Travel Chairs, Inc.*, 806 F.2d 1565, 1576 (Fed. Cir. 1986).

*Miles Laboratories, Inc. v. Shandon*, 997 F.2d 870, 875 (Fed. Cir. 1993).

USPTO Office Action for U.S. Appl. No. 11/623,728, dated Jan. 6, 2010 (15 pages).

Australian Examiner's Report for Application No. 2008200041, dated May 15, 2009 (2 pages).

(56) References Cited

OTHER PUBLICATIONS

Australian Examiner's Report for Application No. 2008200003, dated May 22, 2009 (1 page).
Australian Examiner's Report for Application No. 2008200040, dated Nov. 26, 2009 (2 pages).
USPTO Office Action for U.S. Appl. No. 11/623,731, dated Jan. 19, 2010 (15 pages).
USPTO Examiner Interview Summary for U.S. Appl. No. 11/623,728, dated Apr. 5, 2010 (3 pages).
USPTO Examiner Interview Summary for U.S. Appl. No. 11/623,731, dated Mar. 29, 2010 (3 pages).
International Preliminary Report on Patentability for International Application No. PCT/US08/50253; dated Dec. 7, 2009 (8 pages).
Australian Notice of Acceptance for Application No. 2008200003, dated Jul. 5, 2010 (3 pages).
Japanese Office Action with English translation for Application No. 2008-006254, dated Aug. 3, 2010 (4 pages).
USPTO Office Action for U.S. Appl. No. 11/623,728, dated Sep. 29, 2010 (18 pages).
Japanese Office Action with English translation for Application No. 2008-6253, dated Jan. 4, 2011 (6 pages).
Japanese Office Action with English translation for Application No. 2008-6255, dated Jan. 4, 2011 (8 pages).
USPTO Examiner Interview Summary for U.S. Appl. No. 11/623,728, dated Feb. 16, 2011 (3 pages).
Japanese Office Action with English translation for Application No. 2008-006254, dated Mar. 22, 2011 (7 pages).
Australian Examiner's Report for Application No. 2008200040, dated Aug. 17, 2011 (3 pages).
Japanese Office Action with English translation for Application No. 2008-6253, dated Jul. 26, 2011 (8 pages).
Japanese Office Action with English translation for Application No. 2008-6255, dated Aug. 9, 2011 (7 pages).
Patent Pending U.S. Appl. No. 11/623,731 entitled *System and Method for Managing Discretion Trading Orders* by Peter (nmi) Bartko, et al.; 52 pages plus 11 pages of drawings, filed Jan. 16, 2007.
Patent Pending U.S. Appl. No. 11/623,728 entitled *System and Method for Managing Trading Orders in Aggregated Order Books* by Peter (nmi) Bartko, et al.; 50 pages plus 11 pages of drawings, filed Jan. 16, 2007.
USPTO Office Action for U.S. Appl. No. 11/623,728, dated Apr. 6, 2012 (19 pages).
Japanese Office Action with English translation for Application No. 2008-6254, dated Nov. 15, 2011 (4 pages).
Canadian Exam Report for Application No. 2618323, dated Dec. 8, 2011 (3 pages).
Canadian Exam Report for Application No. 2618245, dated Feb. 9, 2012 (4 pages).
Japanese Notice of Allowance for Application No. 2008-6255, dated Mar. 6, 2012 (3 pages).
Australian First Examiner's Report for Application No. 2015203515, dated Oct. 13, 2016 (4 pages).
Canadian Exam Report for Application No. 2618347, dated Dec. 1, 2016 (8 pages).
Canadian Exam Report for Application No. 2618323, dated Jul. 20, 2017 (6 pages).
Australian Second Examiner's Report for Application No. 2015203515, dated Sep. 22, 2017 (3 pages).
Canadian Exam Report for Application No. 2618245, dated Dec. 14, 2017 (12 pages).
Canadian Final Action for Application No. 2618347, dated Mar. 27, 2018 (8 pages).
Canadian Exam Report for Application No. 2618323, dated Jun. 18, 2018 (8 pages).
Australian Examiner's Report for Application No. 2011213909, dated Sep. 26, 2013 (3 pages).
Canadian Exam Report for Application No. 2618323, dated Aug. 12, 2013 (4 pages).
Canadian Exam Report for Application No. 2618323, dated Nov. 28, 2014 (5 pages).
Canadian Exam Report for Application No. 2618323, dated Sep. 1, 2015 (7 pages).
Canadian Exam Report for Application No. 2618347, dated Apr. 2, 2012 (3 pages).
Canadian Exam Report for Application No. 2618347, dated Nov. 21, 2013 (3 pages).
Canadian Exam Report for Application No. 2618347, dated Nov. 27, 2015 (5 pages).
Canadian Exam Report for Application No. 2618245, dated Apr. 28, 2014 (4 pages).
Canadian Exam Report for Application No. 2618245, dated May 14, 2015 (7 pages).

\* cited by examiner

BID BOOK — EUROS  1 PIP = 0.0001

| BID | ROOT VALUE | FRACTIONAL PIP VALUE | QUANTITY | TIME |
|---|---|---|---|---|
| A | 1.2025 | 2 | 5,000,000 | 14:22:01 |
| B | 1.2025 | 6 | 4,000,000 | 14:22:03 |
| C | 1.2025 | 4 | 3,000,000 | 14:22:04 |
| D | 1.2025 | N/A | 500,000 | 14:22:06 |

CONFIGURABLE CONDITION: IF TRADING ORDER IS ASSOCIATED WITH FRACTIONAL PIP VALUE AND IF QUANTITY OF TRADING ORDER IS LESS THAN 1,000,000 EUROS, THEN REJECT TRADING ORDER

OFFER BOOK — EUROS  1 PIP = 0.0001

| OFFER | ROOT VALUE | FRACTIONAL PIP VALUE | QUANTITY | TIME |
|---|---|---|---|---|
| F | 1.2025 | 8 | 2,000,000 | 14:21:45 |
| G | 1.2025 | 1 | 2,000,000 | 14:22:10 |

BID BOOK — THREE MONTH FUTURES IN EUR/USD — 1 PIP=0.0001

| BID | QUANTITY | ROOT VALUE | FRACTIONAL PIP VALUE | DISCRETION VALUE | BASE PRICE | LIMIT PRICE | TIME |
|---|---|---|---|---|---|---|---|
| A | 5,000,000 | 1.2023 | N/A | 2 | 1.2023 | 1.2025 | 14:02:02 |
| B | 5,000,000 | 1.2023 | 4 | N/A | 1.20234 | N/A | 14:02:05 |
| C | 5,000,000 | 1.2024 | 2 | 1 | 1.20242 | 1.20252 | 14:02:06 |
| D | 5,000,000 | 1.2023 | 4 | 3 | 1.20234 | 1.20264 | 14:02:10 |

OFFER BOOK — THREE MONTH FUTURES IN EUR/USD — 1 PIP=0.0001

| OFFER | QUANTITY | ROOT VALUE | FRACTIONAL PIP VALUE | DISCRETION VALUE | BASE PRICE | LIMIT PRICE | TIME |
|---|---|---|---|---|---|---|---|
| M | 5,000,000 | 1.2025 | N/A | 1 | 1.2025 | 1.2024 | 14:02:13 |
| N | 5,000,000 | 1.2024 | 4 | 1 | 1.20244 | 1.20234 | 14:02:15 |

TRADE CONFIRMATION

| BID | OFFER | INTERSECTION RANGE | MIDPOINT PRICE |
|---|---|---|---|
| C | M | 1.20242-1.2025 | 1.20246 |

TRADE CONFIRMATION

| BID | OFFER | INTERSECTION RANGE | MIDPOINT PRICE |
|---|---|---|---|
| D | N | 1.20234-1.20244 | 1.20239 |

*FIG. 10*

| FIG. 10A |
|---|
| FIG. 10B |

*FIG. 10A*       36

BASIC BID BOOK

| BID | TYPE | QUANTITY | BASE PRICE | DISCRETION VALUE | LIMIT PRICE | TIME RECEIVED | STATUS |
|---|---|---|---|---|---|---|---|
| A | BASIC | 100,000 | 8 | 3 | 11 | 12:24:02 | EXECUTED THIRD AT $11.00 |
| ~~C~~ | ~~FLEX~~ | ~~500,000~~ | ~~8~~ | ~~2~~ | ~~10~~ | ~~12:24:06~~ | DELETED |
| D | BASIC | 100,000 | 8 | 2 | 10 | 12:24:08 | EXECUTED FOURTH AT $10.00 |

44x — BID row header
12x — A
12z — C
12x — D 28  32  52  54

BASIC OFFER BOOK

| OFFER | TYPE | QUANTITY | BASE PRICE | DISCRETION VALUE | LIMIT PRICE | TIME RECEIVED | STATUS |
|---|---|---|---|---|---|---|---|
| E | FLEX | 3,800,000 | 11 | 2 | 9 | 12:24:10 | PENDING |

44x 28  32  52  54

SPECIAL BID BOOK

| BID | TYPE | QUANTITY | BASE PRICE | DISCRETION VALUE | LIMIT PRICE | TIME RECEIVED | STATUS |
|---|---|---|---|---|---|---|---|
| B | SPECIAL | 500,000 | 8 | 2 | 10 | 12:24:04 | EXECUTED FIRST AT $9.50 |
| C | FLEX | 500,000 | 8 | 2 | 10 | 12:24:06 | EXECUTED SECOND AT $9.50 |

# SYSTEM AND METHOD FOR MANAGING DISPLAY OF MARKET DATA IN AN ELECTRONIC TRADING SYSTEM

TECHNICAL FIELD OF THE INVENTION

The present invention relates generally to electronic trading and more specifically to a system and method for managing display of market data in an electronic trading system.

BACKGROUND OF THE INVENTION

In recent years, electronic trading systems have gained widespread acceptance for the trading of a variety of items, such as goods, services, stocks, bonds, currencies, and commodities. In traditional trading systems, a particular trader may submit a trading order associated with a particular price. The trading system typically discloses the particular price associated with the trading order to other traders in the trading system. Other traders, such as hedge fund investors, may use the disclosed price to the disadvantage of the particular trader. In particular, other traders may use the disclosed price to engage in certain types of arbitrage trading. This arbitrage trading may decrease liquidity in the trading system.

In addition, in traditional trading systems, traders may submit discretion trading orders. When the trading system matches a discretion order from a first trader with a discretion order from a second trader, the trading system may execute the trade at a price that unfairly favors one trader over the other. Because such a trade unfairly disadvantages one of the traders, the trading system discourages traders from submitting discretion orders. A reduction in discretion orders may decrease liquidity in the trading system.

SUMMARY OF THE INVENTION

In accordance with the present invention, the disadvantages and problems associated with prior electronic trading systems have been substantially reduced or eliminated.

In some embodiments, a system for managing trading orders comprises a memory operable to store a first order associated with a particular trading product, wherein the first order is associated with a first price comprising a first root value. The system further comprises a processor communicatively coupled to the memory and operable to receive a second order associated with the particular trading product. The second order is associated with a second price; and the second price comprises a second root value and a particular fractional pip value. The processor is further operable to disclose the first root value and the second root value while suppressing the particular fractional pip value.

The invention has several important technical advantages. Various embodiments of the invention may have none, some, or all of these advantages. One advantage is that the trading system discourages certain types of arbitrage trading. In particular, the trading system allows a trader to express the price of a trading order in fractions of a pip. The trading system may disclose the trading order to other traders in the trading system. However, the trading system may prevent the disclosure of a portion of the price of the trading order. In particular, the trading system may prevent the disclosure of the "fractional pip" portion of the price. Thus, market data disclosed by the trading system may not indicate whether a particular trading order is associated with a price that is better than that of another trading order. By preventing the disclosure of the "fractional pip" portion of the price, the trading system may discourage certain types of arbitrage trading. A reduction in arbitrage trading may increase liquidity in trading system.

Another advantage is that the trading system may provide incentives for traders to submit discretion orders. In particular, when the trading system receives a trading order with a discretion range that overlaps the discretion range of a counterorder, the trading system may determine a price at the midpoint of the intersecting portion of the two discretion ranges. The trading system may then execute a trade at the determined midpoint price. By executing the trade at the determined midpoint price, the trading system may avoid executing the trade at a price that unfairly disadvantages one party. The trading system may thereby encourage traders to submit discretion orders. An increase in discretion orders may increase liquidity in the trading system.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 2 illustrates example order books comprising trading orders associated with fractional pip values, according to certain embodiments;

FIG. 7 illustrates example order books, according to certain embodiments;

DETAILED DESCRIPTION OF THE INVENTION

Figure 1:
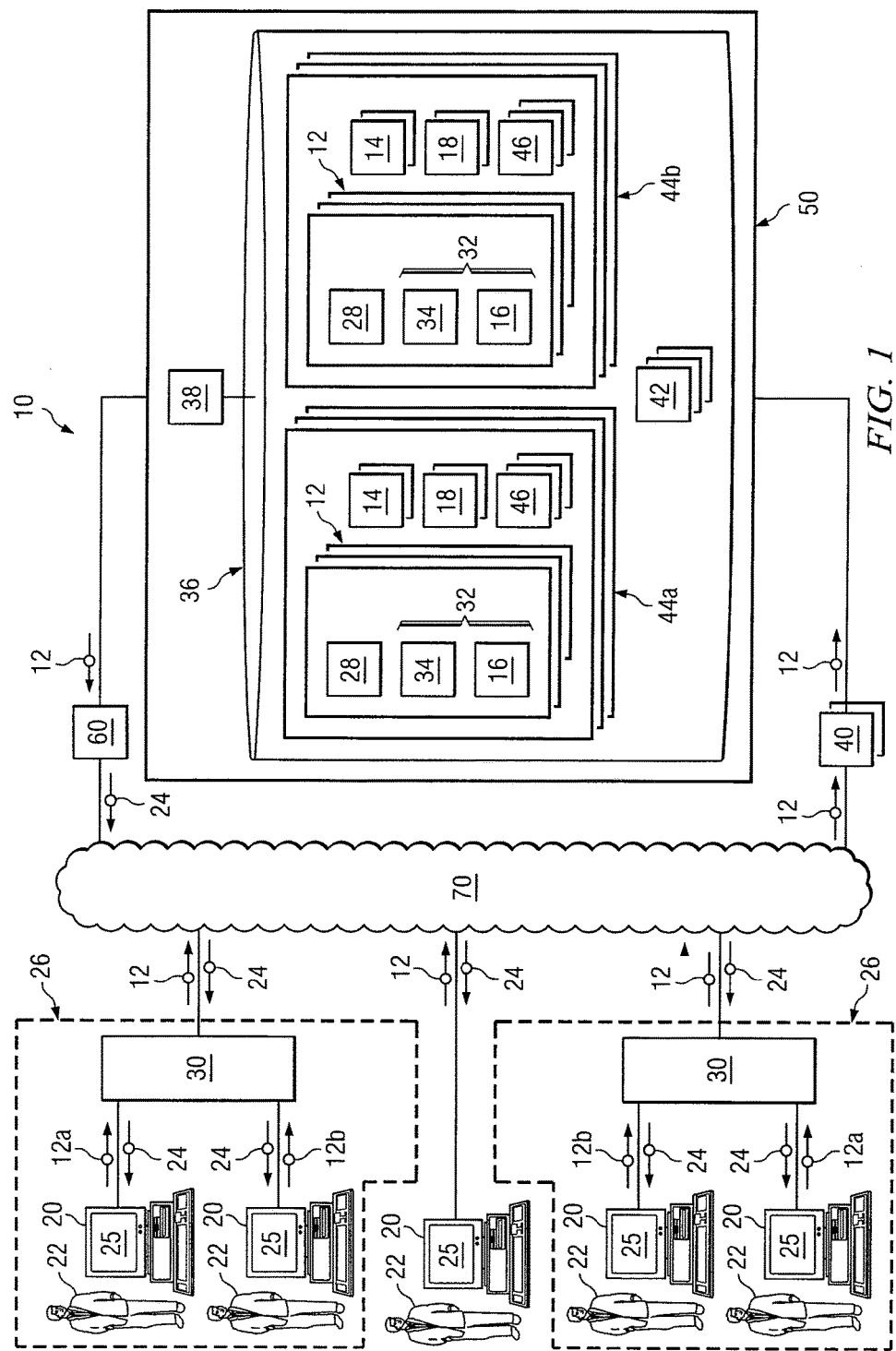
FIG. 1 illustrates one embodiment of a trading system in accordance with the present invention.

FIG. 1 illustrates one embodiment of a trading system 10. Trading system 10 may comprise clients 20, manager servers 30, gateway servers 40, a trading platform 50, and a market data server 60 communicatively coupled by one or more networks 70. Generally, trading system 10 is operable to receive, process, and match trading orders 12 from clients 20. Trading system 10 may allow trader 22 to designate an order price in whole pips 14 and/or in fractions of pips 14.

The portion of the order price expressed in fractions of pips 14 may be referred to as a fractional pip value 16. In some embodiments, trading system 10 may provide incentives for traders 22 to submit trading orders 12 associated with fractional pip values 16. Trading system 10 may further allow trader 22 to submit trading order 12 that comprises a discretion range 18. In some embodiments, trading system 10 may provide incentives for traders 22 to submit trading orders 12 that comprise discretion ranges 18.

Trading orders 12 associated with fractional pip values 16 are described herein with respect to at least FIGS. 1-4. Trading orders 12 associated with discretion ranges 18 are described herein with respect to at least FIGS. 5-8. Rules 42 for managing trading among different groups of traders 22 are discussed herein with respect to at least FIGS. 9-11.

Processing Trading Orders with Fractional Pip Values

Trading system 10 may comprise one or more clients 20. Client 20 represents any suitable local or remote end-user device that may be used by traders 22 to access one or more elements of trading system 10, such as trading platform 50. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of trading system 10. Client 20 may also comprise any suitable user interface such as a display, microphone, keyboard, or any other appropriate terminal equipment according to particular configurations and arrangements. It will be understood that trading system 10 may comprise any number and combination of clients 20. In some embodiments, client 20 may comprise a graphical user interface (GUI) 25.

GUI 25 is generally operable to tailor and filter data presented to trader 22. GUI 25 may provide trader 22 with an efficient and user-friendly presentation of trading orders 12, market data 24, and/or other suitable information. GUI 25 may comprise a plurality of displays having interactive fields, pull-down lists, and buttons operated by trader 22. In one example, GUI 25 presents relevant market data 24 to trader 22 and conceals the remaining information to reduce visual clutter. Then, upon receiving a request from trader 22, GUI 25 expands the visual representation of market data 24 to display trading history, trading volumes, credit limits, and/or other suitable information. GUI 25 may include multiple levels of abstraction including groupings and boundaries. It should be understood that the term graphical user interface may be used in the singular or in the plural to describe one or more graphical user interfaces 25 and each of the displays of a particular graphical user interface 25.

Clients 20 are operable to receive trading orders 12 from traders 22 and to send trading orders 12 to gateway server 40. Trading orders 12 may comprise orders to trade products such as, for example, currencies, financial instruments, stocks, bonds, futures contracts, equity securities, mutual funds, options, derivatives, commodities, or any number and combination of suitable trading products. Trading orders 12 may comprise bids, offers, market orders, limit orders, stop loss orders, day orders, open orders, GTC ("good till cancelled") orders, "good through" orders, "all or none" orders, "any part" orders, or any other suitable order for trading.

A particular trading order 12 may be referred to as an order 12a or a counterorder 12b. Orders 12a and counterorders 12b represent complementary actions such as, for example, buying and selling. If the party that submits a particular order 12a is referred to as trader 22, then the party that submits a corresponding counterorder 12b may be referred to as a "counterparty" trader 22. If a particular order 12a represents a buy order (e.g., bid, take, lift, etc.), then a corresponding counterorder 12b may represent a sell order (e.g., offer, hit, etc.). Conversely, if a particular order 12a represents a sell order, then a corresponding counterorder 12b may represent a buy order.

Although clients 20 are described herein as being used by "traders", it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in trading system 10. Certain traders 22 in trading system 10 may be associated with market makers 26.

Market maker 26 may refer to any individual, firm, or other entity that submits and/or maintains either or both bid and offer trading orders 12 simultaneously for the same instrument. For example, a market maker 26 may be a brokerage or bank that maintains either a firm bid and/or offer price in a given security by standing ready, willing, and able to buy and/or sell that security at publicly quoted prices. A market maker 26 generally displays bid and/or offer prices for specific numbers of specific securities, and if these prices are met, the market maker 26 will immediately buy for and/or sell from its own accounts. According to certain embodiments, a single trading order 12 may be filled by a number of market makers 26 at potentially different prices.

In some embodiments, market makers 26 may include individuals, firms or other entities that are granted particular privileges such that trading orders 12 received from such individuals, firms or other entities are treated as being received from a traditional market maker 26 (such as a brokerage or bank, for example). For example, certain individuals, firms or other entities that may otherwise be treated as customers may be granted privileges to be treated as market makers 26 for the purposes of the systems and methods discussed herein. To receive market maker privileges, an individual, firm or other entity may be required to pay a fee, pay a commission, or submit and/or simultaneously maintain both bid and offer trading orders 12 for particular instruments. According to certain embodiments, an individual, firm or other entity may be designated as a market maker 26 for particular instruments but as a non-market maker for other instruments.

In some embodiments, a multi-tiered system of market makers 26 may be employed. Trading platform 50 may grant different privileges to different market makers 26 based on one or more criteria such as, for example, whether the market maker 26 is associated with an electronic feed, whether the market maker 26 is a strong trader 22, or whether the market maker 26 has particular information. Market makers 26 may be categorized into different tiers for different tradable instruments. For instance, a particular market maker 26 may be categorized as a first-level market maker 26 for instrument(s) for which that market maker 26 is a strong trader 22 and as a second-level market maker 26 for other types of instruments.

In some embodiments, clients 20 may be communicatively coupled to manager server 30. The combination of a particular manager server 30 and one or more clients 20 may represent a computer system maintained and operated by a particular market maker 26. Manager server 30 associated with a particular market maker 26 is generally operable to monitor trading orders 12 submitted by traders 22 associated with the particular market maker 26. Manager server 30 may regulate credit extended to other market makers 26 and/or traders 22 in trading system 10. Based at least in part on market data 24, manager server 30 is operable to regulate trading activities associated with market maker 26. Manager server 30 may comprise any suitable combination of hardware and/or software implemented in one or more modules to provide the described functions and operations. In some embodiments, manager server 30 may comprise a general-purpose personal computer (PC), a Macintosh, a workstation, a Unix-based computer, a server computer, or any suitable processing device.

Clients 20 and/or manager servers 30 may be communicatively coupled to one or more gateway servers 40 via network 70. Gateway servers 40 generally support communication between clients 20, market makers 26, and trading platform 50. As clients 20 log into trading system 10, gateway servers 40 may perform authentication, load balancing, and/or other suitable functions. A particular gateway server 40 may comprise any suitable combination of hardware and/or software implemented in one or more modules to provide the described functions and operations. In some embodiments, gateway server 40 may comprise a general-purpose personal computer (PC), a Macintosh, a workstation, a Unix-based computer, a server computer, or any suitable processing device.

Gateway server 40 may be communicatively coupled to trading platform 50. Trading platform 50 is generally operable to process, route, and match trading orders 12 from traders 22. Trading platform 50 is operable to process trading orders 12 by filling orders 12a with one or more corresponding counterorders 12b. Filling an order 12a refers to matching, satisfying, filling, or exhausting that order 12a with one or more corresponding counterorders 12b. For example, if a particular order 12a is a buy order for product A with quantity 28 of 100,000 units and counterorder 12b is a sell order of 200,000 units of product A, then using counterorder 12b to fill quantity 28 of order 12a may comprise routing, assigning, earmarking, or transferring 100,000 units of product A from counterorder 12b to the particular trader 22 associated with order 12a.

In some embodiments, trading platform 50 is operable to process trading order 12 according to the particular type and price of trading order 12. When trader 22 uses client 20 to submit trading order 12, trader 22 may specify the particular trading product associated with trading order 12. A trading product may be a currency, stock, bond, futures contract, equity, mutual fund, security, option, derivative, commodity, or any number and combination of suitable trading product.

In conjunction with designating a particular trading product, trader 22 may input quantity 28 of the trading product and base price 32 associated with trading order 12. Base price 32 generally represents the target price at which trader 22 hopes to buy or sell the designated trading product. In some embodiments, base price 32 may be expressed as a currency amount. For example, trading order 12 for 100,000 shares of a particular security may comprise base price 32 of $32.00 per share. In this example, 100,000 shares represents quantity 28 and $32.00 per share represents price. In other embodiments, however, base price 32 may be expressed as a currency exchange rate. For example, trading order 12 for three-month futures in euros may be associated with base price 32 of 1.2045. Thus, assuming that Trader A and Trader B enter a three-month futures contract for euros with base price 32 of 1.2045 and quantity 28 of $10,000,000, Trader A and Trader B will exchange $10,000,000 at the rate of 1.2045 (i.e., 1 euro=1.2045 dollars) when the futures contract matures at the end of the three months. In this example, the exchange rate (i.e., 1.2045) represents base price 32 and $10,000,000 represents quantity 28 of trading order 12. In yet other embodiments, base price 32 may be expressed as an interest rate and quantity 28 may be expressed as a loan amount. Thus, it should be understood that base price 32 may be expressed as any currency, rate, unit, or other suitable metric. It should be further understood that quantity 28 may be expressed as any suitable unit, value, currency, or metric.

In some embodiments, base price 32 may comprise root value 34 and fractional pip value 16. Root value 34 may comprise the portion of base price 32 corresponding to one or more whole pips 14. A pip 14 generally refers to the basic unit of price movement for a particular trading product in trading system 10. For example, trading system 10 may be configured such that the basic unit of price movement for a particular commodity is a tenth of a cent (i.e., $0.001). If the market price of that commodity changes from $32.005 to $32.015, then the market price increased by ten pips 14. As another example, trading system 10 may be configured such that the basic unit of price movement in EUR/USD is one ten-thousandth of the exchange rate (i.e., 0.0001). If the exchange rate for EUR/USD changes from 1.3000 to 1.3010, then the exchange rate increased by ten pips 14. In some embodiments, trading platform 50 is operable to configure the basic unit of price movement (i.e., pip 14) for each trading product in trading system 10.

The foregoing example illustrates a particular pip 14 of $0.001 for a particular commodity. For another commodity, trading platform 50 may determine that pip 14 is $0.1, $0.01, or any other suitable integral and/or decimal value. Although the foregoing example illustrates that pip 14 for EUR/USD is 0.0001, trading platform 50 may be configured to specify that pip 14 for EUR/USD is 0.01, 0.001, and/or any other suitable integral and/or decimal value. Although price for the particular commodity was expressed in dollars in the foregoing example, it should be understood that a particular trading product may be associated with suitable type of currency, rate, value, and/or metric.

Some trading orders 12 in trading system 10 may comprise base price 32 that is expressed in whole pips 14. For example, if pip 14 for a particular commodity is a tenth of a cent (i.e., $0.001), then base price 32 of $45.234 is a "whole pip" price. Some trading orders 12, however, may comprise base price 32 that comprises a fraction of pip 14. For example, if pip 14 for particular commodity is a tenth of a cent (i.e., $0.001), then base price 32 of $45.234<u>6</u> comprises a fractional pip value 16 (i.e., "0.<u>6</u>" of a pip 14). The "whole pip" portion of base price 32 may be referred to as the root value 34. The portion of base price 32 that is not one or more whole pips 14 (e.g. "0.<u>6</u>" of a pip 14) may be referred to as the fractional pip value 16.

An example illustrates certain embodiments. In this example, trading platform 50 is configured such that, for euros, one pip 14 is 0.0001 of the exchange rate. Trader uses client 20 to submit trading order 12 comprising quantity 28 of 1,000,000 euros and base price 32 of 1.30235. Because one pip 14 in this example is 0.0001, base price 32 comprises root value 34 of "1.3023" and fractional pip value 16 of "5".

Trading platform 50 is generally operable to receive, process, and match trading orders 12 that comprise fractional pip values 16. In some embodiments, when trading platform 50 receives from a particular trader 22 trading order 12 comprising root value 34 and fractional pip value 16, trading platform 50 may disclose root value 34 of trading order 12 to other traders 22 in trading system 10. According to certain embodiments, trading platform 50 may prevent fractional pip value 16 of trading order 12 from being disclosed to other traders 22 in trading system 10. By preventing the disclosure of fractional pip values 16, trading platform 50 may reduce certain types of arbitrage in trading system 10.

Trading platform 50 may include any suitable combination of hardware, software, personnel, devices, components, elements, or objects that may be utilized or implemented to achieve the operations and functions of an administrative body or a supervising entity that manages or administers a trading environment. In some embodiments, trading platform 50 may comprise memory 36 and processor 38.

Memory 36 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory 36 as internal to trading platform 50, it should be understood that memory 36 may be internal or external to components of trading system 10, depending on particular implementations. Also, memory 36 may be separate from or integral to other memory devices to achieve any suitable arrangement of memory devices for use in trading system 10. According to certain embodiments, memory 36 may comprise rules 42 and order books 44.

Rules 42 comprise software instructions for routing, matching, processing, and/or filling trading orders 12. Processor 38 is operable to execute rules 42 to match orders 12_a_ and counterorders 12_b_. Rules 42 may further comprise instructions for disclosing information regarding trading orders 12. In some embodiments, rules 42 comprise instructions for managing the sequence in which trading orders 12 are filled.

Order books 44 represent queues for storing, sorting, and processing information regarding trading orders 12 received from traders 22. Each order book 44 in memory 36 may be associated with a respective trading product. In some embodiments, a particular order book 44 may be associated with a particular type of trading order 12. For example, memory 36 may comprise a first order book 44 that stores bids for a particular security as well as a second order book 44 that stores offers for the particular security. Order book 44 that stores bids may be referred to as bid book 44_a_, and order book 44 that stores offers may be referred to as offer book 44_b_.

In some embodiments, order book 44 may comprise one or more configurable conditions 46. Configurable condition 46 may specify a threshold, limitation, characteristic, and/or criteria for trading orders 12 that are stored in order book 44. For example, configurable condition 46 may specify that, if trading order 12 comprises fractional pip value 16 and if quantity 28 of trading order 12 is less than a configurable threshold, trading platform 50 should reject trading order 12. As another example, configurable condition 46 may direct trading platform 50 to reject trading order 12 from trader 22 if trader 22 has exceeded a particular credit limit. It should be understood that order book 44 in memory 36 may comprise any suitable number and combination of configurable conditions 46.

Memory 36 may be communicatively coupled to processor 38. Processor 38 is generally operable to execute rules 42 stored in memory 36 to process, route, and match trading orders 12. Processor 38 comprises any suitable combination of hardware and software implemented in one or more modules to provide the described function or operation.

It should be understood that the internal structure of trading platform 50 and the interfaces, processors, and memory devices associated therewith is malleable and can be readily changed, modified, rearranged, or reconfigured to achieve the intended operations of trading platform 50.

Trading platform 50 may be communicatively coupled to market data server 60. Market data server 60 is generally operable to receive from trading platform 50 information regarding trading orders 12 in order books 44. The received information may comprise quantities 28, base prices 32, root values 34, fractional pip values 16, and/or other suitable characteristics associated with trading orders 12 in order books 44. In some embodiments, market data server 60 receives information from trading platform 50 in real-time or substantially real-time as processor 38 receives trading orders 12 from clients 20 and updates order books 44. Based at least in part on the information from order books 44, market data server 60 is operable to generate market data 24. Market data 24 may comprise market information such as, for example, trading conditions, trading volumes, quantities 28 associated with trading orders 12, yield spreads, and so forth. Market data server 60 may comprise any suitable combination of hardware and/or software implemented in one or more modules to provide the described functions and operations. In some embodiments, market data server 60 may comprise a general-purpose personal computer (PC), a Macintosh, a workstation, a Unix-based computer, a server computer, or any suitable processing device.

According to certain embodiments, market data server 60 is operable to prevent the disclosure of fractional pip values 16 associated with trading orders 12 in order books 44. In some embodiments, in generating market data 24, market data server 60 may filter any fractional pip values 16 from market data 24 sent to clients 20. In other embodiments, market data server 60 may delete fractional pip values 16 from market data 24. In yet other embodiments, market data server 60 may mask fractional pip values 16 such that client 20 is unable to display fractional pip values 16 associated with trading orders 12. By preventing the disclosure of fractional pip values 16 associated with trading orders 12, market data server 60 may discourage traders 22 from engaging in certain types of arbitrage.

In some embodiments, market data 24 may be configured to list trading orders 12 in a sequence that does not suggest which trading order 12 has market priority (i.e., which trading order 12 is associated with the best base price 32). In a particular order book 44, a particular trading order 12 has market priority if that trading order 12 is associated with the most favorable base price 32. In some embodiments, if order book 44 for a particular trading product comprises multiple trading orders 12 associated with the same root value 34, market data 24 may list the multiple trading orders 12 chronologically, randomly, or according to any suitable sequence.

Because market data 24 may not comprise fractional pip values 16, a particular trader 22 may employ various tactics to try to determine the particular fractional pip value 16 of the best base price 32. In particular, the particular trader 22 may submit a series of trading orders 12 wherein each trading order 12 is associated with a respective fractional pip value 16. The particular trader 22 may assume that market data 24 will display first the particular trading order 12 with market priority. Thus, the particular trader 22 may assume that, if one of the series of trading orders 12 appears first in market data 24, then base price 32 of that particular trading order 12 is the best base price 32 in order book 44. The particular trader 22 may then attempt to cancel the other trading orders 12 that he or she submitted. Trading system 10 may prevent this type of tactic by configuring market data 24 to list trading orders 12 chronologically, randomly, or according to any other suitable sequence that does not suggest which trading order 12 has market priority. Because market data 24 displays multiple trading orders 12 associated with the same root value 34 according to such a sequence and because market data 24 filters out fractional pip values 16, the multiple trading orders 12 appear to have equal market priority despite the fact that only a portion of the displayed trading orders 12 may, in fact, have actual market priority.

As explained above, clients 20, manager servers 30, gateway servers 40, trading platform 50, and market data server 60 may be communicatively coupled via one or more networks 70. Network 70 may represent any number and combination of wireline and/or wireless networks suitable for data transmission. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations.

It should be understood that the internal structure of trading system 10 and the servers, processors, and memory devices associated therewith is malleable and can be readily changed, modified, rearranged, or reconfigured to achieve the intended operations of trading system 10. In particular, although FIG. 1 illustrates market data server 60 as separate from trading platform 50, it should be understood that, in some embodiments, trading platform 50 may be operable to perform the functions and operations of market data server 60. Similarly, although gateway server 40 is illustrated as being separate from trading platform 50, it should be understood that, in some embodiments, trading platform 50 may be operable to perform the functions and operations of gateway server 40.

Processing Trading Order with Fractional Pip Value

In operation, traders 22 may use clients 20 to submit trading orders 12. A particular trading order 12 may be associated with base price 32 that comprises root value 34 and fractional pip value 16. Upon receiving trading order 12, processor 38 may determine the particular trading product associated with trading order 12. Processor 38 may then store trading order 12 in the particular order book 44 corresponding to the determined trading product. For a given trading order 12, processor 38 may store in order book 44 the particular quantity 28 of trading product associated with trading order 12, root value 34 associated with trading order 12, and fractional pip value 16 associated with trading order 12. In some embodiments, processor 38 may store in order book 44 the time at which trading platform 50 received trading order 12.

According to certain embodiments, processor 38 is operable to transmit to market data server 60 information regarding trading orders 12 in order books 44 stored in memory 36. Market data server 60 may receive this information in real-time or substantially real-time as processor 38 receives trading orders 12 and updates order books 44. Based at least in part on the information from order books 44, processor 38 is operable to generate market data 24. Market data 24 may comprise the particular root value 34 and quantity 28 associated with each trading order 12 in order books 44. If order book 44 for a particular trading product comprises multiple trading orders 12 associated with the same root value 34, market data 24 may list the multiple trading orders 12 chronologically, randomly, or according to any suitable sequence. Market data server 60, client 20, and/or trading platform 50 is operable to prevent the disclosure of fractional pip values 16 associated with trading orders 12 in order books 44. In some embodiments, in generating market data 24, market data server 60 may filter any fractional pip values 16 from market data 24. In some embodiments, client 20 and/or trading platform 50 may filter any fractional pip values 16 from market data 24. Because fractional pip values 16 may be filtered from market data 24, trader 22 may not be able to determine the particular fractional pip value 16 of the best base price 32 in order book 44. Accordingly, trading system 10 may prevent or reduce certain types of arbitrage.

In conjunction with receiving market data 24, a particular trader 22 may use client 20 to submit counterorder 12b for the particular trading product. Counterorder 12b may be associated with base price 32 that comprises root value 34 and fractional pip value 16. Upon receiving counterorder 12b, processor 38 may identify in order book 44 associated with the particular trading product any trading orders 12 that satisfy base price 32 associated with counterorder 12b. From among the identified trading orders 12, processor 38 may determine the particular trading order 12 associated with the best base price 32. Processor 38 may then use counterorder 12b to fill at least a portion of the determined trading order 12.

FIG. 2 illustrates example order books 44, according to certain embodiments. In particular, FIG. 2 illustrates an example bid book 44a and an example offer book 44b that store trading orders 12 for euros. Bid book 44a and offer book 44b may be stored in memory 36 in trading platform 50. Offer book 44b comprises information regarding offers received by trading platform 50. In the present example, for each offer, offer book 44b comprises root value 34, fractional pip value 16, quantity 28 of the particular offer, the time the particular offer was received, and the status of the particular offer. Bid book 44a comprises similar information for bids received by trading platform 50. In the present example, bid book 44a also comprises configurable threshold. In particular, configurable threshold directs trading platform 50 to reject trading order 12 if trading order 12 is associated with a non-zero fractional pip value 16 and with quantity 28 that is less than 1,000,000 euros.

In the present example, Trader A submits to trading platform 50 Bid A for 5,000,000 euros at base price 32 of 1.20252. Bid A is received by trading platform 50 at 14:22:01. In the present example, trading platform 50 comprises a rule 42 that, for euros, one pip 14 equals 0.0001. Upon receiving Bid A, processor 38 determines that base price 32 associated with Bid A comprises root value 34 of 1.2025 and fractional pip value 16 of two. Processor 38 then determines whether Bid A complies with configurable threshold. In this example, because Bid A is associated with quantity 28 of more than 1,000,000 euros, processor 38 does not reject Bid A. Processor 38 subsequently generates an entry in bid book 44a corresponding to Bid A. In particular, processor 38 stores in bid book 44a root value 34 of 1.2025, fractional pip value 16 of two, quantity 28 of 5,000,000, and time of 14:22:01.

After generating in bid book 44a an entry corresponding to Bid A, processor 38 determines whether offer book 44b comprises an offer that satisfies Bid A. In this example, at the time trading platform 50 receives Bid A, offer book 44b comprises one offer—Offer F. Because Offer F is associated with base price 32 of 1.20258 and Bid A is associated with base price 32 of 1.20252, processor 38 determines that Offer F does not satisfy Bid A. Accordingly, processor 38 waits to receive additional trading orders 12.

In the present example, trading platform 50 subsequently receives Bids B, C, and D. Bid B is received at 14:22:03 and is for 4,000,000 euros at base price 32 of 1.20256. Bid C is received at 14:22:04 and is for 3,000,000 euros at base price 32 of 1.20254. Bid D is received at 14:22:06 and is for 500,000 euros at base price 32 of 1.2025. Because Bids B, C, and D each comply with configurable threshold, processor 38 generates in bid book 44*a* a respective entry for each of Bids B, C, and D.

Trading platform 50 subsequently receives Bid E for 400,000 euros at base price 32 of 1.20253. Because Bid E is associated with a non-zero fractional pip value 16 and because quantity 28 of Bid E is less than 1,000,000 euros, processor 38 rejects Bid E. Accordingly, processor 38 does not generate in bid book 44*a* an entry for Bid E.

In the present example, market data server 60 is operable to generate market data 24 based at least in part on information stored in order books 44. In this example, market data server 60 is configured to generate market data 24 comprising the particular root value 34 and quantity 28 associated with each trading order 12 in order books 44. In this example, when order book 44 comprises multiple trading orders 12 associated with the same root value 34, market data 24 is configured to list the multiple trading orders 12 chronologically. Market data server 60 is configured to filter any fractional pip values 16 from market data 24. Accordingly, after receiving Bid D, market data server 60 generates market data 24 based at least in part on Bids A-D. In particular, market data 24 lists Bids A-D chronologically in association with root value 34 of 1.2025. In this example, market data 24 does not comprise fractional pip values 16 for Bids A-D. Market data server 60 transmits market data 24 to manager servers 30 and clients 20 via network 70. Because market data 24 lists trading orders 12 chronologically and without fractional pip values 16, market data 24 does not indicate to trader 22 the best base price 32 in the example bid book 44*a*.

In the present example, after receiving Bid D, processor 38 subsequently receives Offer G for 2,000,000 euros at base price 32 of 1.20251. In this example, processor 38 is configured to use counterorder 12*b* to first fill the particular order 12*a* that satisfies counterorder 12*b* and that is associated with the best price. Upon receiving Offer G, processor 38 identifies Bids A, B, and C as being associated with base prices 32 that satisfy Offer G. From among the identified bids, processor 38 identifies the particular bid that is associated with the best price. In this example, processor 38 identifies Bid B. Accordingly, processor 38 uses Offer G to fill at least a portion of Bid B. Thus, even though market data 24 listed Bids A-D chronologically (i.e., with Bid B displayed after Bid A), processor 38 in this example uses Offer G to fill Bid B prior to filling the other bids in bid book 44*a*.

In the foregoing example, trading platform 50 received trading orders 12 for euros. It should be understood, however, that trading platform 50 is operable to receive, process, and match trading orders 12 for any suitable type and combination of trading products.

In the foregoing example, trading platform 50 is configured such that one pip 14 for a particular exchange rate is 0.0001. It should be understood, however, that trading platform 50 may process trading orders 12 associated with any suitable exchange rate. It should be further understood that, for a particular exchange rate, trading platform 50 may be configured such that one pip 14 is 0.01, 0.001, and/or any suitable integral or decimal value.

Figure 3:
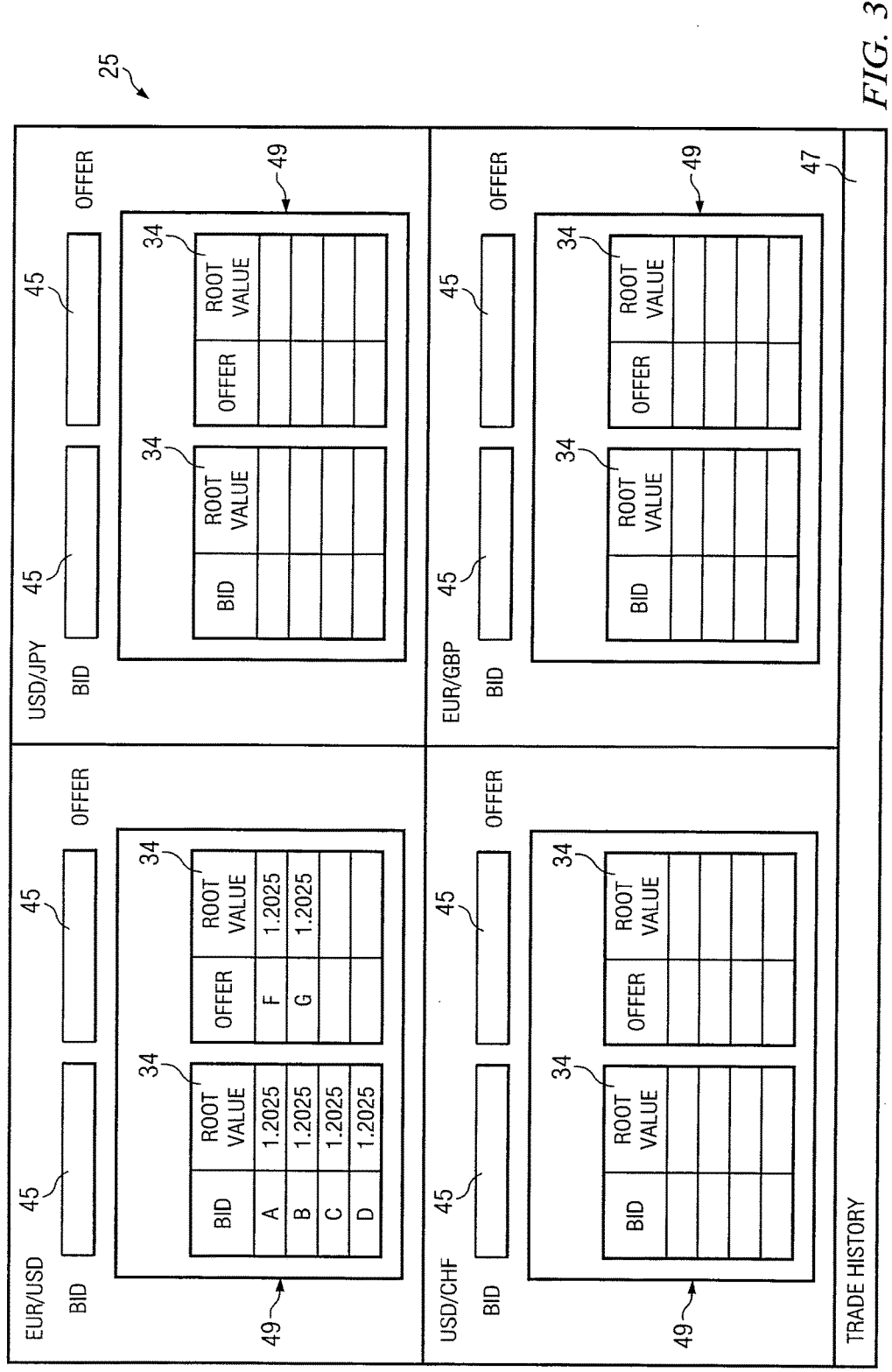
FIG. 3 illustrates a graphical user interface for displaying market data, according to certain embodiments.

FIG. 3 illustrates an example graphical user interface 25 that displays market data 24, according to certain embodiments. In some embodiments, processor 38 may execute rules 42 in memory 36 to provide graphical user interface 25 to client 20 via network 70. In other embodiments, client 20 may execute instructions stored in client 20 to display graphical user interface 25. In this example, graphical user interface 25 comprises one or more order entry fields 45. Each order entry field 45 may be associated with a respective trading product. In the present example, graphical user interface 25 comprises a first order entry field 45 associated with EUR/USD, a second order entry field 45 associated with USD/JPY, a third order entry field 45 associated with USD/CHF, and a fourth order entry field 45 associated with EUR/GBP. It should be understood, however, that order entry field 45 may be associated with equities, notes, commodities, futures, and/or any suitable number and combination of trading products.

In addition, or alternatively, to displaying order entry fields 45, graphical user interface 25 may display trade history viewer 47 and market data viewer 49. Trade history viewer 47 in graphical user interface 25 associated with a particular trader 22 is generally operable to display trading orders 12 submitted by the particular trader 22. Market data viewer 49 is generally operable to display market data 24 from market data server 60. As explained above, market data server 60 may receive from trading platform 50 information regarding trading orders 12 in order books 44 in memory 36. Based at least in part on the received information, market data server 60 may generate market data 24. In some embodiments, market data 24 may represent the particular trading orders 12 in order book 44, the respective time when trading platform 50 received each of the particular trading orders 12, and/or the particular base price 32 associated with each trading order 12 in order book 44. In other embodiments, market data 24 may comprise the best base price 32 from each order book 44 in trading platform 50.

Market data 24 displayed in market data viewer 49 in graphical user interface 25 may be generated by market data server 60. Market data 24 in the example market data viewer 49 lists Bids A-D (described above with respect to FIG. 2). In this example, market data server 60 is configured to generate market data 24 comprising the particular root value 34 and quantity 28 associated with each trading order 12 in order books 44. In this example, when order book 44 comprises multiple trading orders 12 associated with the same root value 34, market data 24 is configured to list the multiple trading orders 12 chronologically. Market data server 60 filters any fractional pip values 16 from market data 24. Accordingly, after receiving Bid D, market data server 60 generates market data 24 based at least in part on Bids A-D. In particular, market data 24 lists Bids A-D chronologically in association with root value 34 of 1.2025. Market data 24 does not comprise fractional pip values 16 for Bids A-D. In a similar fashion, market data viewer 49 displays Offers F and G. Market data server 60 transmits market data 24 to manager servers 30 and clients 20 via network 70. Because market data 24 lists trading orders 12 chronologically and without fractional pip values 16, market data 24 does not indicate to trader 22 the precise level of the best base price 32 in order book 44. In addition, because market data server 60 filtered fractional pip values 16 from market data 24, market data 24 does not indicate to trader 22 which of Bids A-D is associated with the best base price 32.

In the foregoing example, trading orders 12 in market data 24 are displayed chronologically according to when trading platform 50 received each trading order 12. It should be understood, however, that market data server 60 may configure market data 24 to list trading orders 12 in a random sequence, in a reverse chronological sequence, and/or according to any suitable sequence, grouping, and/or arrangement.

In the foregoing example, market data 24 listed each bid in bid book 44a. In some embodiments, however, market data 24 may be configured to list only the first-received trading order 12 and/or the last-received trading order 12. In other embodiments, market data 24 may be configured to list a particular subset of trading orders 12. The particular subset may be based on the identity of traders 22 that submitted trading orders 12, quantity 28 of trading orders 12, and/or any other suitable criteria.

Figure 4:
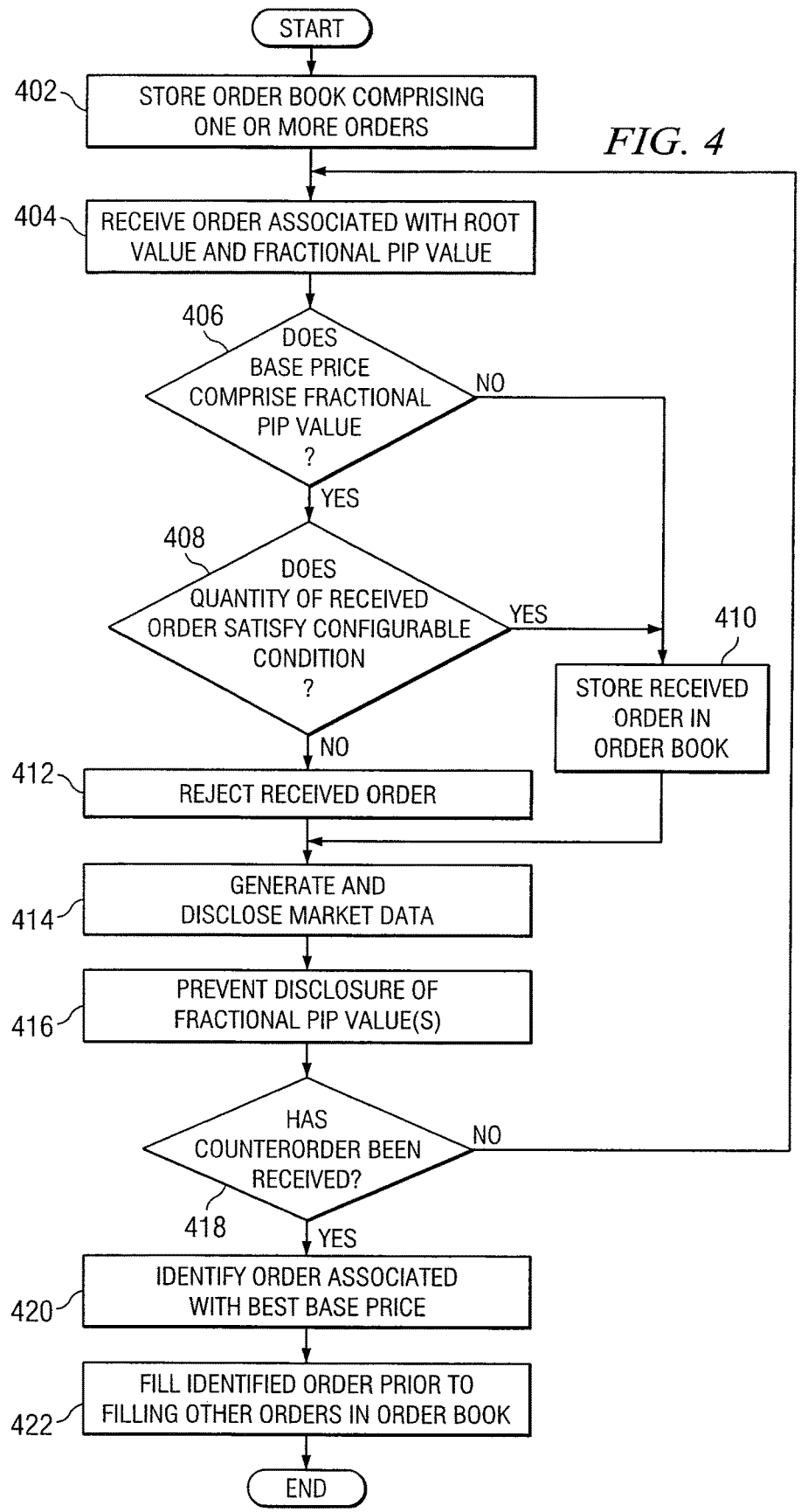
FIG. 4 illustrates a flowchart for processing a trading order associated with a fractional pip value, according to certain embodiments.

FIG. 4 illustrates a flowchart for processing trading order 12 associated with fractional pip value 16. The method begins at step 402 by storing in memory 36 a particular order book 44 comprising one or more trading orders 12. At step 404, processor 38 receives a particular trading order 12 associated with a particular quantity 28 and a particular base price 32. At step 406, processor 38 determines whether the particular base price 32 comprises fractional pip value 16. If the particular base price 32 does not comprise fractional pip value 16, the method proceeds to step 410. If, however, the particular base price 32 comprises fractional pip value 16, then at step 408 processor 38 determines whether the received trading order 12 satisfies configurable condition 46 stored in memory 36. In some embodiments, configurable condition 46 may direct processor 38 to reject trading order 12 if quantity 28 of trading order 12 does not satisfy a configurable threshold. If the particular quantity 28 satisfies the configurable threshold, then at step 410 processor 38 stores the received trading order 12 in order book 44. If, however, processor 38 determines at step 408 that the received trading order 12 does not satisfy the configurable condition 46, then at step 412 processor 38 rejects the received trading order 12. The method then proceeds to step 414.

At step 414, processor 38 generates and discloses market data 24. At step 416, processor 38 prevents the disclosure of any fractional pip value(s) 16 associated with trading order(s) 12 in order book 44. In some embodiments, in generating market data 24, market data server 60 may filter any fractional pip values 16 from market data 24 sent to clients 20. In other embodiments, market data server 60 may delete fractional pip values 16 from market data 24. In yet other embodiments, market data server 60 may mask fractional pip values 16 such that client 20 is unable to display fractional pip values 16 associated with trading orders 12. Processor 38 then determines at step 418 whether trading platform 50 has received counterorder 12b that satisfies any trading order 12 in order book 44. If processor 38 determines at step 418 that trading platform 50 has not received counterorder 12b that satisfies any trading order 12 in order book 44, then the method returns to step 404. If, however, processor 38 determines at step 418 that trading platform 50 has received counterorder 12b that satisfies at least one trading order 12 in order book 44, then at step 420 processor 38 identifies in order book 44 the particular trading order 12 that satisfies counterorder 12b and that is associated with the best base price 32. At step 422, processor 38 uses counterorder 12b to fill at least a portion of the identified trading order 12. The method then ends.

Processing Trading Order with Discretion Range

In some embodiments, trading system 10 may allow trader 22 to submit trading order 12 associated with a particular base price 32 and a particular discretion value 52. Discretion value 52 refers to a price tolerance within which trader 22 is willing to buy or sell a particular trading product. For example, if trader 22 submits a bid for a particular trading product comprising base value of $8 and discretion value 52 of $2, then trader 22 is willing to pay up to $10 for the particular trading product. Because the bid is associated with discretion value 52, if the best offer in offer book 44b is associated with base price 32 of $9, trading platform 50 may execute the trade at a price of $9.

Upon receiving trading order 12 associated with base price 32 and discretion value 52, processor 38 is operable to determine limit price 54. Limit price 54 refers to the limit of the price tolerance indicated by discretion value 52. In the foregoing example, the bid was associated with base price 32 of $8 and discretion value 52 of $2. Thus, limit price 54 is $10. Base price 32 and limit price 54 define the discretion range 18. In the foregoing example, discretion range 18 of the bid spans from $8 (base price 32) to $10 (limit price 54).

In some embodiments, trading platform 50 may match order 12a associated with discretion range 18 with counterorder 12b associated with discretion range 18. According to certain embodiments, if the two discretion ranges 18 overlap, trading platform 50 may execute the trade at a midpoint price 56. Midpoint price 56 refers to the midpoint value of the overlapping portion of the two discretion ranges 18. By executing the trade at midpoint price 56, neither trader 22 is unfairly disadvantaged for having submitted trading order 12 with discretion value 52. Because trading system 10, in some embodiments, ensures that traders 22 who submit trading orders 12 associated with discretion values 52 are not unfairly disadvantaged, trading system 10 may encourage traders 22 to submit trading orders 12 with discretion values 52. An increase in such trading orders 12 may increase liquidity in trading system 10.

As explained above, trading platform 50 is operable to match trading orders 12 associated with discretion ranges 18. In operation, trader 22 may use client 20 to submit order 12a associated with base price 32 and discretion value 52. Upon receiving order 12a, processor 38 may determine limit price 54 associated with order 12a. Processor 38 may determine limit price 54 based at least in part on the particular base price 32 and the particular discretion value 52 associated with order 12a. Processor 38 may then store order 12a in order book 44 of memory 36. In association with order 12a, processor 38 may store in order book 44 the particular quantity 28 of order 12a, the particular discretion value 52 associated with order 12a, the particular base price 32 associated with order 12a, the particular limit price 54 associated with order 12a, and/or the time at which trading platform 50 received order 12a.

Trading platform 50 is further operable to receive counterorder 12b comprising a particular base value and a particular discretion value 52. Based at least in part on the particular base price 32 and the particular discretion value 52, processor 38 may determine limit price 54 associated with counterorder 12b. Processor 38 may then store counterorder 12b in counter order book 44 of memory 36. In association with counterorder 12b, processor 38 may store in counter order book 44 the particular quantity 28, discretion value 52, base price 32, limit price 54, and time associated with counterorder 12b.

Processor 38 may then determine whether the received counterorder 12b satisfies the received order 12a. Processor 38 may determine that counterorder 12b satisfies the received order 12a if discretion range 18 associated with counterorder 12b touches or intersects discretion range 18 associated with order 12a. The particular discretion ranges 18 "touch" if limit price 54 of counterorder 12*b* is equal to limit price 54 of order 12*a*. The particular discretion ranges 18 intersect if discretion range 18 of order 12*a* overlaps discretion range 18 of counterorder 12*b*. For example, discretion ranges 18 of order 12*a* and counterorder 12*b* may intersect if limit price 54 of counterorder 12*b* crosses limit price 54 of order 12*a*. (In general, a bid price is said to "cross" an offer price if the bid price is more than the offer price. Conversely, an offer price is said to "cross" a bid price if the offer price is less than the bid price.) If discretion range 18 of counterorder 12*b* touches but does not overlap or intersect discretion range 18 of order 12*a*, then processor 38 may execute trade between order 12*a* and counterorder 12*b* at limit price 54 of order 12*a* and counterorder 12*b*.

If, however, discretion range 18 of counterorder 12*b* overlaps or intersects discretion range 18 of order 12*a*, then processor 38 may execute a trade between order 12*a* and counterorder 12*b* at midpoint price 56. The portion of discretion range 18 associated with order 12*a* that intersects with discretion range 18 of counterorder 12*b* may be referred to as intersection range 58. Processor 38 may determine midpoint price 56 based at least in part on the midpoint of intersection range 58.

An example illustrates various embodiments. Trading platform 50 receives an offer associated with base price 32 of $12 and discretion value 52 of $3. Based at least in part on base price 32 and discretion range 18, processor 38 determines that the offer is associated with limit price 54 of $9 and discretion range 18 from $12 to $9. Subsequently, trading platform 50 receives a bid associated with base price 32 of $8 and discretion value 52 of $2. Based at least in part on base price 32 and discretion range 18, processor 38 determines that the bid is associated with limit price 54 of $10 and discretion range 18 from $8 to $10.

In this example, processor 38 determines that discretion range 18 associated with the offer intersects with discretion range 18 associated with the bid. In particular, processor 38 determines that intersection range 58 is from $9 (limit price 54 of the offer) to $10 (limit price 54 of the bid). Processor 38 then determines that midpoint price 56 of the determined intersection range 58 is $9.50. In this example, processor 38 executes trade between the bid and the offer at the determined midpoint price 56 of $9.50.

In the foregoing example, the determined midpoint price 56 is the average of limit price 54 associated with the offer and limit price 54 associated with the bid. In other embodiments, processor 38 may determine that midpoint price 56 is the average of base price 32 associated with order 12*a* and base price 32 associated with counterorder 12*b*. For example, processor 38 may match a bid with base price 32 of $8 and limit price 54 of $11 with an offer with base price 32 of $10 and limit price 54 of $7. In this example, processor 38 may determine that midpoint price 56 of intersection range 58 is $9. Thus, if base price 32 of counterorder 12*b* crosses limit price 54 of order 12*a* and if limit price 54 of counterorder 12*b* crosses base price 32 of order 12*a*, processor 38 may determine that midpoint price 56 is the average of base price 32 associated with order 12*a* and base price 32 associated with counterorder 12*b*.

In some embodiments, processor 38 may determine that midpoint price 56 is the average of base price 32 of counterorder 12*b* and limit price 54 of counterorder 12*b*. For example, processor 38 may match a bid with base price 32 of $8 and limit price 54 of $11 with an offer with base price 32 of $10 and limit price 54 of $9. In this example, processor 38 may determine that midpoint price 56 of intersection range 58 is $9.50. Thus, if base price 32 of counterorder 12*b* crosses limit price 54 of order 12*a* and if limit price 54 of counterorder 12*b* does not cross base price 32 of order 12*a*, processor 38 may determine that midpoint price 56 is the average of base price 32 of counterorder 12*b* and limit price 54 of counterorder 12*b*.

As illustrated in the foregoing example, processor 38 may determine midpoint price 56 based at least in part on midpoint value of the overlapping portion of two discretion ranges 18. Processor 38 may then execute a trade at the determined midpoint price 56. In some embodiments, processor 38 may execute the trade at midpoint price 56 other than the average value. For example, when discretion range 18 of a resting order 12*a* overlaps with discretion range 18 of counterorder 12*b*, processor 38 may be configured to give more weight to the offer side or to the bid side of the transaction in determining the price at which to execute the trade. As an example, trading platform 50 may be configured to give twice as much weight to the offer side of the transaction. Thus, if the intersection range 58 is between $9 and $10, processor 38 may determine a price of $9.67 (i.e., (9+10+10)/3). Thus, when two discretion ranges 18 overlap, processor 38 may be configured to determine the price of the trade according to any suitable linear combination, formula, algorithm, table, and/or other suitable criteria.

Figure 5:
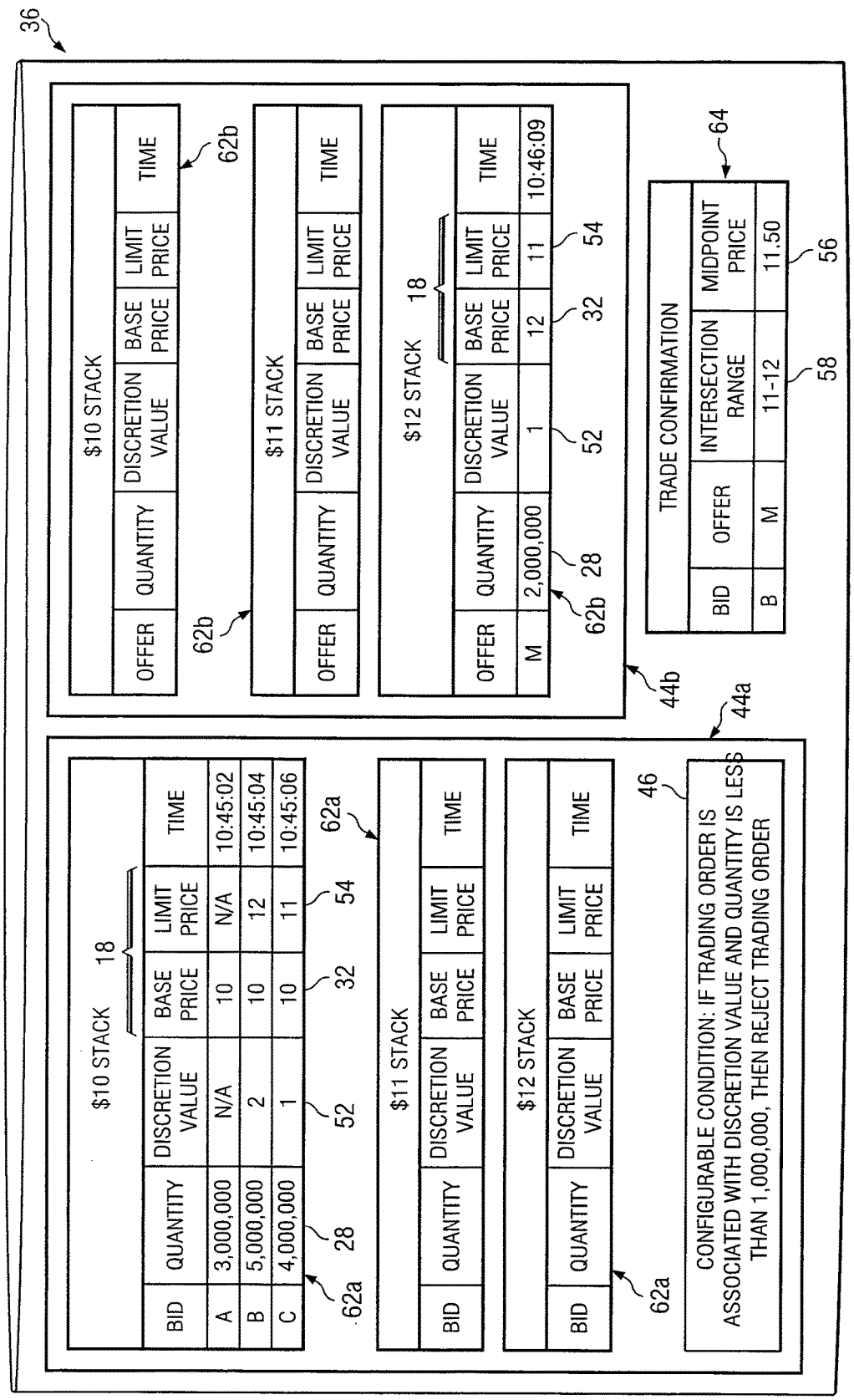
FIG. 5 illustrates example order books comprising trading orders associated with discretion ranges, according to certain embodiments.

FIG. 5 illustrates example order books 44 comprising trading orders 12 associated with discretion values 52, according to certain embodiments. In this example, trading platform 50 comprises offer book 44*b* and bid book 44*a* associated with a particular trading product. Offer book 44*b* comprises multiple offer stacks 62*b*. Each offer stack 62*b* is associated with a respective base price 32. In particular, offer book 44*b* comprises offer stacks 62*b* for base prices 32 of $10, $11, and $12, respectively. Similarly, bid book 44*a* comprises bid stacks 62*a* for base prices 32 of $10, $11, and $12, respectively. Bid book 44*a* further comprises configurable condition 46 that, if a bid is associated with discretion value 52 and quantity 28 of the bid is less than 1,000,000, then processor 38 should reject the bid.

In the present example, trading platform 50 receives Bid A at 10:45:02. Bid A is for 3,000,000 units of trading product at base price 32 of $10. Bid A is not associated with discretion value 52. Processor 38 stores Bid A in bid stack 62*a* associated with base price 32 of $10. In association with Bid A, processor 38 stores quantity 28 of 3,000,000 units, base price 32 of $10, and time of 10:45:02. Because Bid A is not associated with discretion value 52, processor 38 does not store discretion value 52 or limit price 54 in association with Bid A.

Trading platform 50 subsequently receives Bid B at 10:45:04. Bid B is for 5,000,000 units of trading product at base price 32 of $10. Bid B is associated with discretion value 52 of $2. Based at least in part on discretion value 52, processor 38 determines that limit price 54 associated with Bid B is $12. Processor 38 stores Bid B in bid stack 62*a* associated with base price 32 of $10. In association with Bid B, processor 38 stores quantity 28 of 5,000,000 units, base price 32 of $10, discretion value 52 of $2, limit price 54 of $12, and time of 10:45:04.

After receiving Bid B, trading platform 50 receives Bid C at 10:45:06. Bid C is for 4,000,000 units of trading product at base price 32 of $10. Bid C is associated with discretion value 52 of $1. Based at least in part on discretion value 52, processor 38 determines that limit price 54 associated with Bid C is $11. Processor 38 stores Bid C in bid stack 62*a* associated with base price 32 of $10. In association with Bid C, processor 38 stores quantity 28 of 4,000,000 units, base price 32 of $10, discretion value 52 of $1, limit price 54 of $11, and time of 10:45:06.

Processor 38 monitors offer book 44b to determine whether offer book 44b comprises counterorder(s) 12b that satisfy any order(s) 12a in bid book 44a. In this example, trading platform 50 receives Offer M at 10:46:09. Offer M is for 2,000,000 units of trading product at base price 32 of $12. Offer M is associated with discretion price of $1. Based at least in part on discretion value 52, processor 38 determines that limit price 54 associated with Offer M is $11. Processor 38 stores Offer M in offer stack 62b associated with base price 32 of $12.

In this example, trading platform 50 comprises a first rule 42 to first match counterorder 12b with order 12a associated with best base price 32. Accordingly, processor 38 first scans bid stack 62a associated with base price 32 of $12. In this example, processor 38 determines that bid stack 62a associated with base price 32 of $12 is empty. Processor 38 then scans bid stack 62a associated with base price 32 of $11. After determining that bid stack 62a associated with base price 32 of $11 is empty, processor 38 scans bid stack 62a associated with base price 32 of $10. In this example, processor 38 determines that discretion range 18 associated with Offer M satisfies discretion range 18 associated with Bid B and discretion range 18 associated with Bid C.

In this example, trading platform 50 comprises a second rule 42 that, if counterorder 12b matches multiple orders 12a associated with the same base price 32, processor 38 should execute the trade using order 12a associated with best limit price 54. In this example, Bid B is associated with limit price 54 of $12 and Bid C is associated with limit price 54 of $11. Because Bid B is associated with the better limit price 54, processor 38 determines to match Offer M with Bid B.

Processor 38 then determines the price at which to execute the trade involving Bid B and Offer M. In this example, trading platform 50 comprises a third rule 42 that, if discretion range 18 associated with order 12a intersects with discretion range 18 associated with counterorder 12b, the trade is executed at the midpoint of the intersection range 58. In this example, discretion range 18 associated with Bid B is defined by base price 32 of $10 and limit price 54 of $12. Discretion range 18 associated with Offer M is defined by base price 32 of $12 and limit price 54 of $11. Thus, processor 38 determines that intersection range 58 is defined by Offer M's limit price 54 of $11 and Offer M's base price 32 (and/or Bid B's limit price 54) of $12. Processor 38 determines that the midpoint value of intersection range 58 is $11.50. Accordingly, processor 38 executes trade involving Bid B and Offer M at midpoint price 56 of $11.50. In particular, processor 38 fills a portion of Bid B with 2,000,000 units of trading product from Offer M at price of $11.50.

In this example, upon executing a trade, processor 38 is configured to generate and store in memory 36 a trade confirmation record 64. Accordingly, processor 38 generates trade confirmation record 64 for the trade involving Bid B and Offer M. Trade confirmation record 64 comprises midpoint price 56 of $11.50.

In the foregoing example, trading platform 50 received trading orders 12 associated with base prices 32 expressed in dollars. It should be understood, however, that base price 32 may be expressed as any suitable currency, rate, unit, and/or metric.

Figure 6:
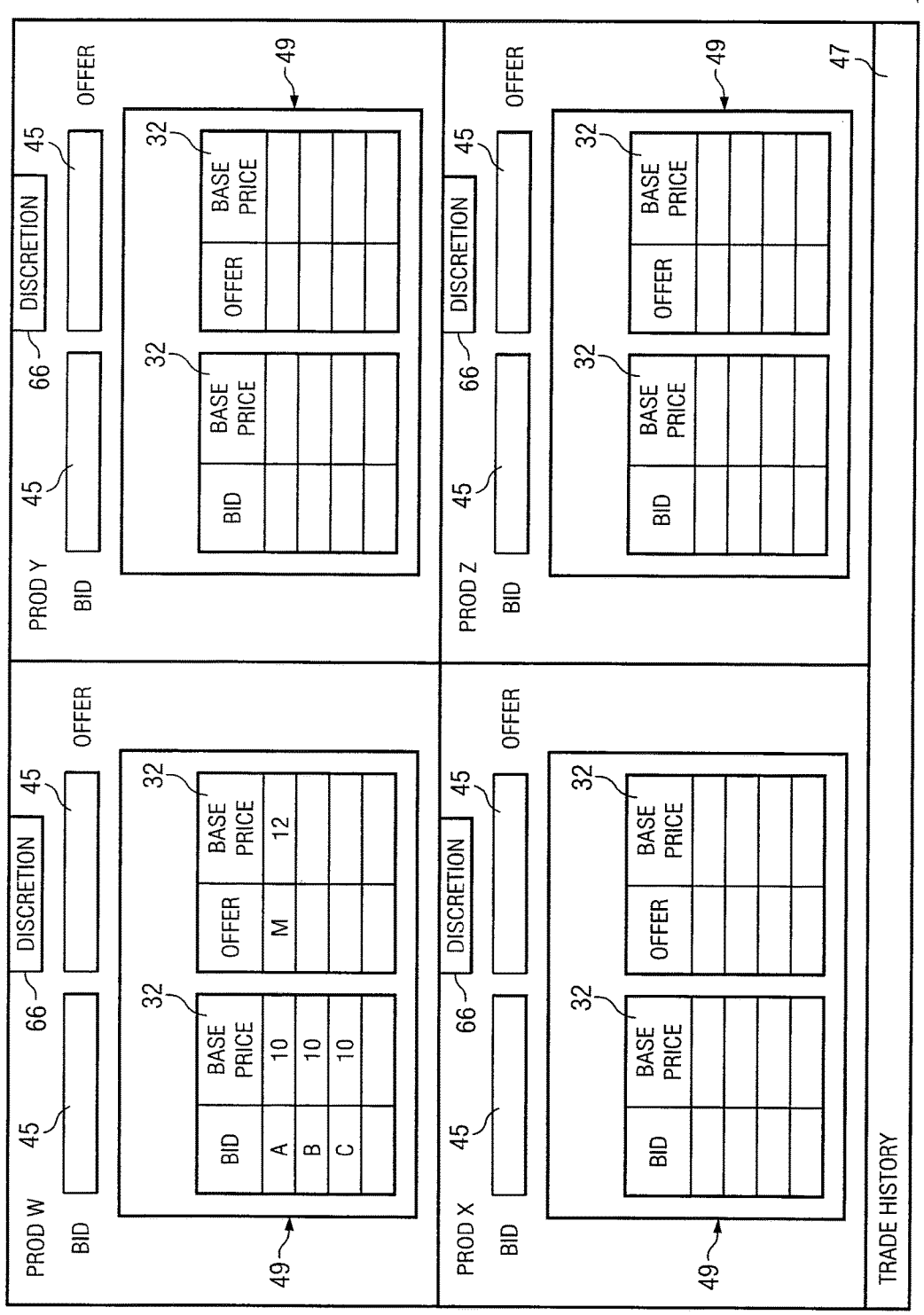
FIG. 6 illustrates a graphical user interface for inputting a trading order associated with a discretion range, according to certain embodiments.

FIG. 6 illustrates an example graphical user interface 25 for receiving trading order 12 associated with discretion value 52, according to certain embodiments. In some embodiments, processor 38 may execute logic in memory 36 to provide graphical user interface 25 to client 20 via network 70. In other embodiments, client 20 may execute instructions stored in client 20 to display graphical user interface 25. In this example, graphical user interface 25 comprises one or more order entry fields 45. Each order entry field 45 may be associated with a respective trading product. In the present example, graphical user interface 25 comprises a first order entry field 45 associated with Trading Product W, a second order entry field 45 associated with Trading Product X, a third order entry field 45 associated with Trading Product Y, and a fourth order entry field 45 associated with Trading Product Z. It should be understood that order entry field 45 may be associated with equities, notes, commodities, futures, and/or any suitable number and combination of trading products.

In some embodiments, order entry field 45 comprises input field and discretion key 66. Trader 22 may use client 20 to input into input field the particular base price 32 and/or the particular quantity 28 of trading order 12. Trader 22 may use client 20 to input into input field fractional pip value 16 and/or discretion value 52 associated with trading order 12.

According to certain embodiments, trader 22 may use discretion key 66 to input discretion value 52 associated with trading order 12. For example, after inputting base price 32 of trading order 12 into input field, trader 22 may select discretion key 66 on graphical user interface 25. After selecting discretion key 66, trader 22 inputs discretion value 52. After receiving discretion value 52, client 20 may generate trading order 12 based at least in part on base price 32 and discretion value 52 received via graphical user interface 25. Client 20 may then transmit trading order 12 to trading platform 50 for execution.

In addition, or alternatively, to displaying order entry fields 45, graphical user interface 25 may display trade history viewer 47 and market data viewer 49. Trade history viewer 47 in graphical user interface 25 associated with a particular trader 22 is generally operable to display trading orders 12 submitted by the particular trader 22. Market data viewer 49 is generally operable to display market data 24 from market data server 60. As explained above, market data server 60 may receive from trading platform 50 information regarding trading orders 12 in order books 44 in memory 36. Based at least in part on the received information, market data server 60 may generate market data 24. In some embodiments, market data 24 may represent the particular trading orders 12 in order book 44, the respective time when trading platform 50 received each of the particular trading orders 12, and/or the particular base price 32 associated with each trading order 12 in order book 44. In other embodiments, market data 24 may comprise the best base price 32 from each order book 44 in trading platform 50.

Market data server 60 is operable to prevent the disclosure of fractional pip value 16 and/or discretion value 52 associated with trading order 12 in order book 44. In particular, market data server 60 may filter from market data 24 any fractional pip values 16 and/or discretion values 52. In the present example, market data viewer 49 displays market data 24 based at least in part on bid book 44a illustrated in FIG. 5. The displayed market data 24 represents Bids A, B, and C chronologically in association with base price 32 of $10. Because market data server 60 filtered discretion values 52 from market data 24, trader 22 viewing market data 24 displayed by graphical user interface 25 is unable to determine best limit price 54 in order book 44. By preventing disclosure of discretion values 52, trading system 10 may reduce or eliminate certain types of arbitrage.

In some embodiments, trading platform 50 may process a particular trading order 12 associated with both fractional pip value 16 and discretion value 52. FIG. 7 illustrates example order books 44 comprising trading orders 12 associated with discretion values 52 and trading orders 12 associated with fractional pip values 16, according to certain embodiments. In this example, trading platform 50 comprises bid book 44*a* associated with three-month futures in the EUR/USD currency pair and offer book 44*b* associated with three-month futures in the EUR/USD currency pair. Trading platform 50 is configured such that, for EUR/USD, one pip 14 equals 0.0001. At 14:02:02, trading platform 50 receives Bid A for quantity 28 of $5,000,000. Bid A is associated with base price 32 of 1.2023 and discretion value 52 of two pips 14. Upon receiving Bid A, processor 38 determines that base price 32 comprises root value 34 of 1.2023 and no fractional pip value 16. Based at least in part on discretion value 52 associated with Bid A, processor 38 determines that limit price 54 associated with Bid A is 1.2025. In bid book 44*a*, processor 38 stores Bid A in association with quantity 28 of $5,000,000, root value 34 of 1.2023, discretion value 52 of two pips 14, limit price 54 of 1.2025, and time of 14:02:02.

In this example, processor 38 then scans offer book 44*b* to determine whether offer book 44*b* comprised offer that satisfies Bid A. In this example, trading platform 50 has not yet received any offers that satisfy Bid A. Trading platform 50 subsequently receives Bids B at 14:02:05. Bid B is for quantity 28 of $5,000,000 at base price 32 of 1.20234. Bid B is not associated with discretion value 52. Accordingly, processor 38 stores Bid B in bid book 44*a* in association with quantity 28 of $5,000,000, root value 34 of 1.2023, fractional pip value 16 of four, and time of 14:02:05. Because Bid B is not associated with discretion value 52, processor 38 does not store limit price 54 for Bid B in bid book 44*a*.

Trading platform 50 subsequently receives Bid C at 14:02:06. Bid C is for quantity 28 of $5,000,000 at base price 32 of 1.20242. Bid C is associated with discretion value 52 of one pip 14. Accordingly, processor 38 stores in bid book 44*a* Bid C in association with root value 34 of 1.2024, fractional pip value 16 of two, discretion value 52 of one, limit price 54 of 1.20252, and time of 14:02:06. Bid D is then received by trading platform 50 at 14:02:10. Bid D is for quantity 28 of $5,000,000 at base price 32 of 1.20234. Bid D is associated with discretion value 52 of three pips 14. Accordingly, processor 38 stores Bid D in bid book 44*a* in association with root value 34 of 1.2023, fractional pip value 16 of four, discretion value 52 of three, limit price 54 of 1.20264, and time of 14:02:10.

Processor 38 monitors offer book 44*b* to determine whether offer book 44*b* comprises any offers that satisfy any bids in bid book 44*a*. In this example, trading platform 50 receives Offer M at 14:02:13. Offer M is for $5,000,000 at base price 32 1.2025. Offer M is associated with discretion value 52 of one pip 14. Accordingly, processor 38 stores Offer M in offer book 44*b* in association with root value 34 of 1.2025, discretion value 52 of one, limit price 54 of 1.2024, and time of 14:02:13.

In this example, trading platform 50 comprises a first rule 42 that, upon receiving counterorder 12*b*, processor 38 should scan order book 44 to identify orders 12*a* that match or cross counterorder 12*b*. Accordingly, upon receiving Offer M, processor 38 scans bid book 44*a* and determines that limit price 54 associated with Offer M crosses limit price 54 associated with Bid A, limit price 54 associated with Bid C, and limit price 54 associated with Bid D. Thus, processor 38 identifies Bids A, C, and D as matching or crossing Offer M.

In this example, trading platform 50 comprises a second rule 42 that, if multiple orders 12*a* are identified as matching or crossing counterorder 12*b*, processor 38 should determine order(s) 12*a* associated with the best base price 32. In this example, Bid A is associated with base price 32 of 1.2023, Bid C is associated with base price 32 of 1.20242, and Bid D is associated with base price 32 of 1.20234. Because Bid C is associated with the best base price 32, processor 38 identifies Bid C as the particular bid to match with Offer M.

Processor 38 then determines the price at which to execute the trade involving Bid C and Offer M. In this example, trading platform 50 comprises a third rule 42 that, if discretion range 18 associated with order 12*a* intersects with discretion range 18 associated with counterorder 12*b*, the trade is executed at midpoint price 56 of intersection range 58. In this example, discretion range 18 associated with Bid C is defined by base price 32 of 1.20242 and limit price 54 of 1.20252. Discretion range 18 associated with Offer M is defined by base price 32 of 1.2025 and limit price 54 of 1.2024. Thus, processor 38 determines that intersection range 58 is defined by Bid C's base price 32 of 1.20242 and Offer M's base price 32 of 1.2025. Processor 38 determines that midpoint price 56 of intersection range 58 is 1.20246. Accordingly, processor 38 executes trade involving Bid C and Offer M at midpoint price 56 of 1.20246. Processor 38 subsequently generates and stores trade confirmation record 64 regarding the trade.

In this example, because Bid C was associated with the best base price 32, trading platform 50 matched Offer M with Bid C rather than Bid A despite Bid A being received first and being associated with discretion range 18 that satisfied Offer M. Thus, trading platform 50 may provide incentives for traders 22 to submit trading orders 12 with better base prices 32. An increase in trading orders 12 with better base prices 32 may increase liquidity in trading system 10.

In the present example, after filling Bid C with Offer M, trading platform 50 removes Bid C and Offer M from order books 44. Trading platform 50 subsequently receives Offer N at 14:02:15. Offer N is for $5,000,000 at base price 32 of 1.20244. Offer N is associated with discretion value 52 of one pip 14. Accordingly, processor 38 stores Offer N in offer book 44*b* in association with root value 34 of 1.2024, fractional pip value 16 of four, discretion value 52 of one, base price 32 of 1.20244, limit price 54 of 1.20234, and time of 14:02:15. Pursuant to the first rule 42 in memory 36, trading platform 50 scans bid book 44*a* to identify any bids that match Offer N. In this example, limit price 54 associated with Offer N crosses limit price 54 associated with Bid A, matches base price 32 associated with Bid B, and matches base price 32 associated with Bid D. (As explained above, Bid C has already been filled.) Thus, processor 38 identifies Bids A, B, and D as matching or crossing Offer N.

As explained above, trading platform 50 in this example comprises a second rule 42 that, if multiple orders 12*a* are identified as matching or crossing counterorder 12*b*, processor 38 should determine order(s) 12*a* associated with the best base price 32. In this example, processor 38 determines that both Bid B and Bid D are associated with the best base price 32—1.20234.

Trading platform 50 comprises a fourth rule 42 that, if two or more of the identified orders 12*a* are associated with the best base price 32, processor 38 should determine, from among the two or more identified orders 12*a* associated with the best base price 32, the particular order 12a associated with the best limit price 54. In this example, Bid B and Bid D are associated with the best base price 32—1.20234. Bid B, however, is not associated with any limit price 54. Bid D is associated with limit price 54 of 1.20264. Because Bid D is associated with a better limit price 54, processor 38 identifies Bid D as the particular bid to match with Offer N.

Processor 38 then determines the price at which to execute the trade involving Bid D and Offer N. As explained above, the third rule 42 in memory 36 specifies that, if discretion range 18 associated with order 12a intersects with discretion range 18 associated with counterorder 12b, the trade is executed at midpoint price 56 of intersection range 58. In this example, discretion range 18 associated with Bid D is defined by base price 32 of 1.20234 and limit price 54 of 1.20264. Discretion range 18 associated with Offer N is defined by base price 32 of 1.20244 and limit price 54 of 1.20234. Thus, processor 38 determines that intersection range 58 is defined by Bid D's base price 32 (and/or Offer N's limit price 54) of 1.20234 and Offer N's base price 32 of 1.20244. Processor 38 determines that the midpoint price 56 of intersection range 58 is 1.20239. Accordingly, processor 38 executes trade involving Bid D and Offer N at midpoint price 56 of 1.20239. Processor 38 subsequently generates and stores in memory 36 trade confirmation record 64 regarding the trade.

In this example, processor 38 matched Offer N with Bid D rather than Bid B at least in part because Bid B was not associated with discretion value 52. Thus, trading system 10 may provide incentives for traders 22 to submit trading orders 12 associated with discretion values 52. An increase in trading orders 12 associated with discretion values 52 may increase liquidity in trading system 10.

In the foregoing example, trading platform 50 is configured such that one pip 14 for a particular exchange rate is 0.0001. It should be understood, however, that for a particular exchange rate, trading platform 50 may be configured such that one pip 14 is 0.01, 0.001, and/or any suitable integral or decimal value.

In the foregoing example, trading platform 50 receives trading orders 12 associated with the EUR/USD currency pair. It should be understood, however, that trading platform 50 may receive and process trading orders 12 associated with USD/JPY, USD/CHF, EUR/GBP, and/or any suitable currency pair. It should be further understood that trading platform 50 may receive and process trading orders 12 associated with any trading product such as, for example, financial instruments, stocks, bonds, futures contracts, equity securities, mutual funds, currencies, options, derivatives, commodities, or any number and combination of suitable trading products.

Figure 8:
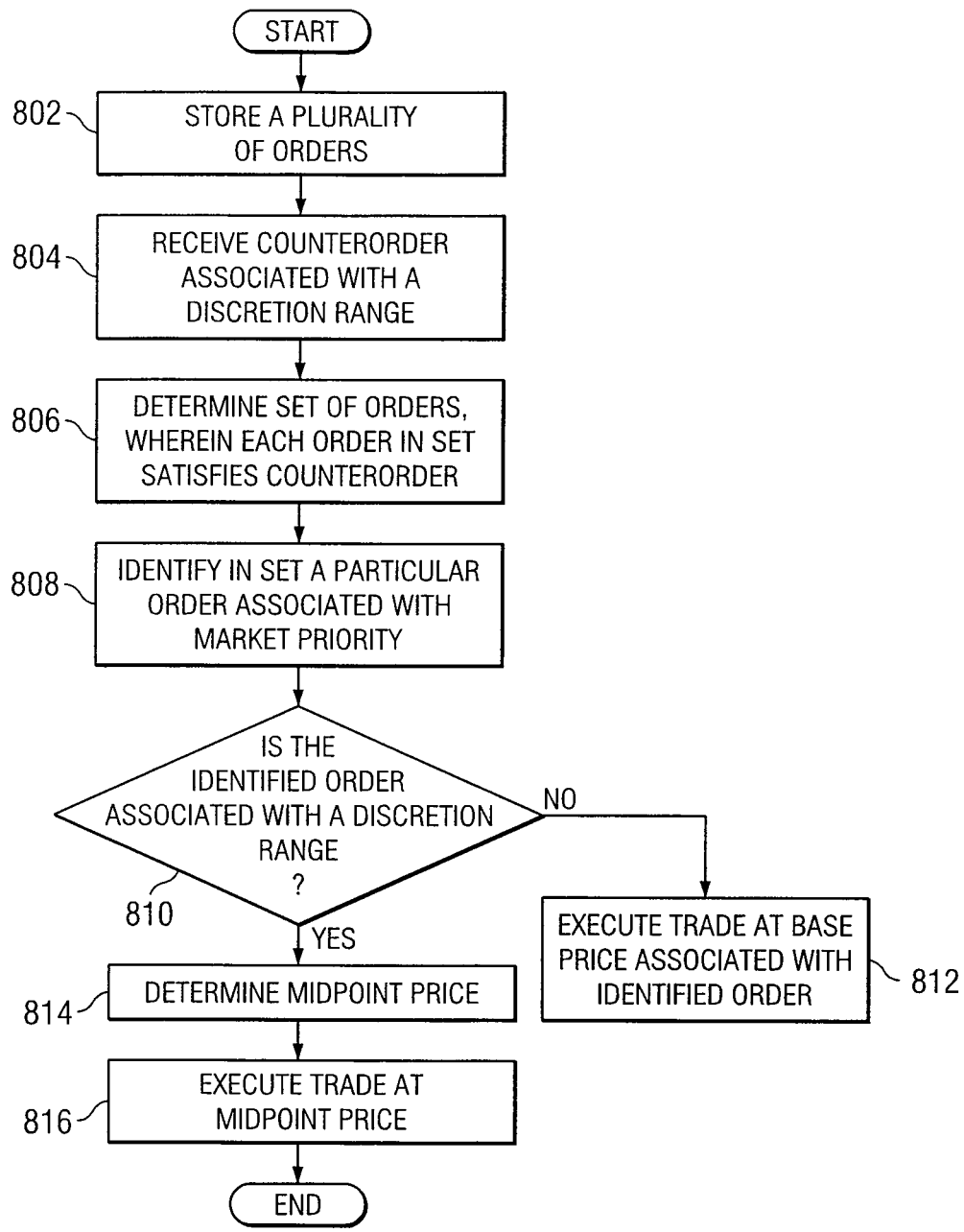
FIG. 8 illustrates a flowchart for processing a trading order associated with a discretion range.

FIG. 8 illustrates a flowchart for processing trading order 12 associated with discretion range 18, according to certain embodiments. The method begins at step 802 by storing in memory 36 a plurality of orders 12a. At step 804, trading platform 50 receives counterorder 12b associated with a particular discretion range 18. At step 806, trading platform 50 identifies a set of orders 12a stored in memory 36, the set comprising each order 12a in memory 36 that satisfies the received counterorder 12b. At step 808, trading platform 50 identifies, from among orders 12a in the identified set, a particular order 12a associated with the best base price 32.

At step 810, trading platform 50 determines whether the identified order 12a is associated with discretion range 18. If trading platform 50 determines at step 810 that identified order 12a is not associated with discretion range 18, then at step 812 trading platform 50 executes a trade based at least in part on the identified order 12a and counterorder 12b. The trade is executed at base price 32 associated with identified order 12a. The method then ends.

If, however, trading platform 50 determines at step 810 that identified order 12a is associated with a particular discretion range 18, then at step 814 trading platform 50 determines midpoint price 56 based at least in part on intersection of discretion range 18 associated with counterorder 12b and discretion range 18 associated with identified order 12a. At step 816, trading platform 50 executes a trade based at least in part on identified order 12a and counterorder 12b. The trade is executed at the determined midpoint price 56. The method then ends.

Managing Trading Among Different Trading Groups

Figure 9:
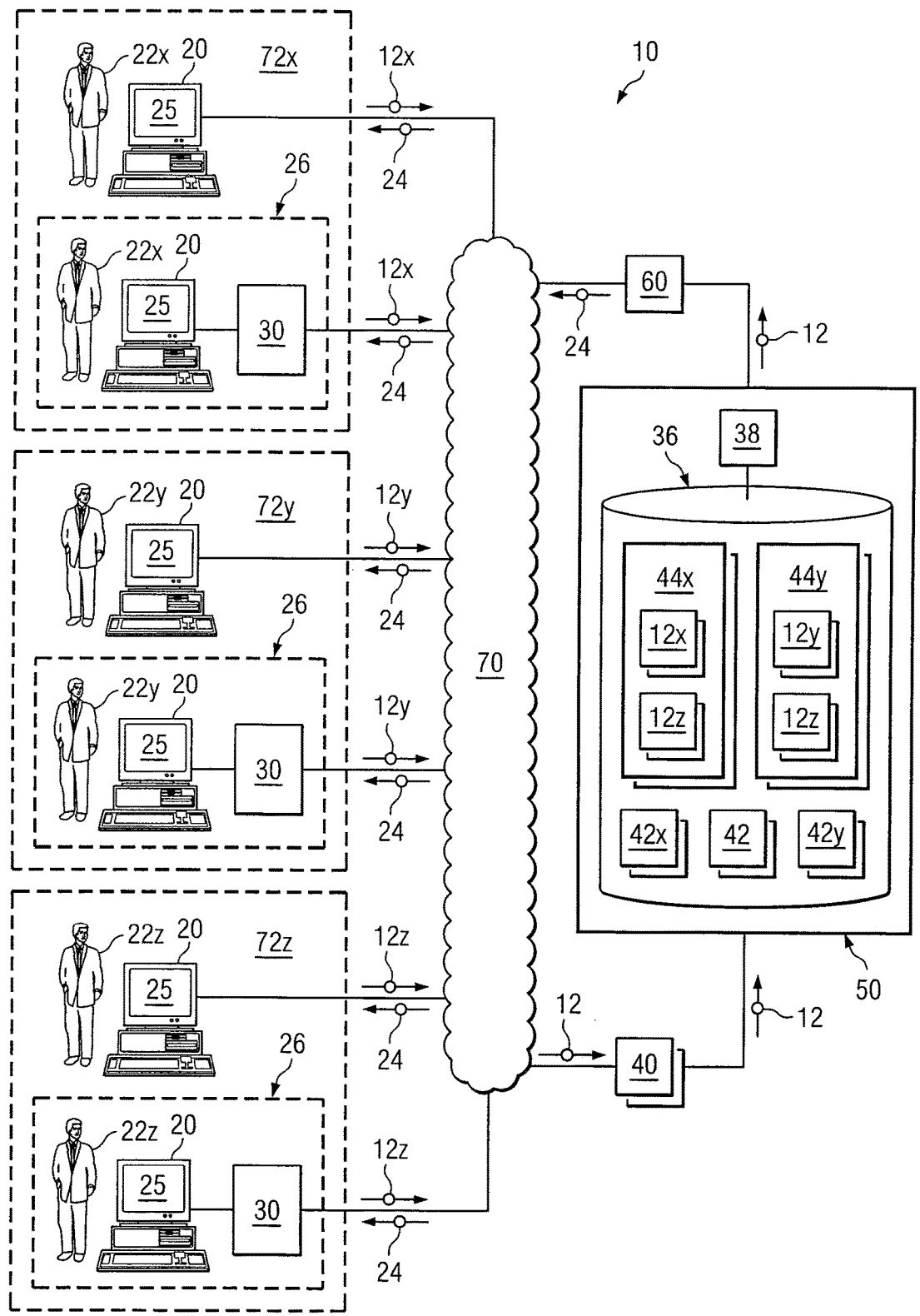
FIG. 9 illustrates a trading system configured to manage trading among basic traders, special traders, and flex traders, according to certain embodiments.

FIG. 9 illustrates trading system 10 configured to manage trading among basic traders 22x and special traders 22y, according to certain embodiments. Trading system 10 comprises clients 20, manager servers 30, gateway servers 40, trading platform 50, and market data server 60 communicatively coupled by network 70. Each of the elements of trading system 10 illustrated in FIG. 9 is operable to perform the functions and/or operations of the corresponding elements illustrated in FIG. 1.

According to certain embodiments, trading system 10 may comprise multiple groups of traders 22. Each group may be referred to as a trading group 72. When a particular trader 22 registers to participate in trading system 10, the particular trader 22 may register as a member of a particular trading group 72. Because traders 22 in trading system 10 may have different objectives, specialties, interests, goals, and/or backgrounds, trading system 10 may offer multiple trading groups 72. For example, two or more traders 22 that have in common a particular specialty may register to participate in trading group 72 associated with the particular specialty. Two or more traders 22 that have in common another specialty may register to participate in trading group 72 associated with the other specialty. Trading group 72 may be defined according to any suitable criteria. In particular, a particular trading group 72 may be defined according to the size, net worth, historic performance, trading volumes, and/or other characteristics of traders 22 in the particular trading group 72. For example, trading system 10 may comprise a particular trading group 72 for banks, another trading group 72 for hedge fund managers, another trading group 72 for individuals, and so forth. It should be understood that trading system 10 may comprise any number and combination of trading groups 72.

According to certain embodiments, trading groups 72 may comprise a basic group 72x, a special group 72y, and a flex group 72z. Basic group 72x and special group 72y represent two distinct groups of traders 22. In some embodiments, basic group 72x corresponds with a basic membership level in trading system 10 and special group 72y corresponds with an advanced membership level. A trader 22 may need to pay a fee and/or satisfy certain criteria to be eligible to join special group 72y. In some embodiments, special group 72y may comprise banks, brokerage firms, and/or other market makers 26. It should be understood, however, that trading system 10 may comprise any number and combination of criteria associated with basic group 72x and/or special group 72y.

Traders 22 in special group 72y may be referred to as special traders 22y, and traders 22 in basic group 72x may be referred to as basic traders 22x. Trading orders 12 from special traders 22y may be referred to as special orders 12y, and trading orders 12 from basic traders 22x may be referred to as basic orders 12x. According to certain embodiments, due to their objectives, strategies, and/or size, special traders 22y may not want to trade with basic traders 22x. In some embodiments, trading platform 50 may be configured to prevent trades between special traders 22y and basic traders 22x. Trading platform 50 may be further configured to prevent the disclosure of special trading orders 12 to basic traders 22x. In particular, trading platform 50 may filter or delete information regarding special trading orders 12 from market data 24 sent to clients 20 associated with basic traders 22x.

As explained above, trading system 10 may comprise flex group 72z of traders 22. According to certain embodiments, flex group 72z comprises traders 22 that are eligible to be special traders 22y but that want to trade with both basic traders 22x and special traders 22y. In some embodiments, traders 22 in flex group 72z may be required to meet the same qualifications and/or pay the same fee as traders 22 in special group 72y. Trading system 10 may be configured to allow traders 22 in flex group 72z to trade with both basic traders 22x and special traders 22y. Traders 22 in flex group 72z may be referred to as flex traders 22z, and trading orders 12 from flex traders 22z may be referred to as flex orders 12z.

Trading platform 50 is operable to receive basic orders 12x, special orders 12y, and flex orders 12z. In some embodiments, trading platform 50 comprises basic order books 44x and special order books 44y. Basic orders books 12x may store basic orders 12x from basic traders 22x, and special order books 44y may store special orders 12y from special traders 22y.

Basic order books 44x and special order books 44y may be used in parallel by trading platform 50. For example, trading platform 50 may comprise basic order book 44x associated with Trading Product X as well as special order book 44y associated with Trading Product X. Upon receiving a first bid for Trading Product X from basic trader 22x, trading platform 50 may store the first bid in basic order book 44x associated with Trading Product X. Upon receiving a second bid for Trading Product X from special trader 22y, trading platform 50 may store the second bid in special order book 44y associated with Trading Product X.

According to certain embodiments, flex order 12z from flex trader 22z may be stored in both basic order book 44x and special order book 44y. For example, upon receiving flex order 12z for Trading Product X, trading platform 50 may store flex order 12z in basic order book 44x for Trading Product X and in special order book 44y for Trading Product X.

Trading platform 50 is operable to manage the priority of trading orders 12 in basic order books 44x and special order books 44y. Each trading order 12 may be stored in the appropriate order book(s) 44 in association with the time trading platform 50 received the particular trading order 12. In general, priority among trading orders 12 may be based at least in part on base price 32 associated with trading order 12 and/or on the time when trading platform 50 received trading order 12. In some embodiments, in a particular order book 44, trading order 12 associated with the best base price 32 has priority. According to certain embodiments, when a particular order book 44 comprises two or more trading orders 12 associated with the best base price 32, then trading platform 50 may assign priority to the particular trading order 12 (from among the two or more trading orders 12 associated with the best base price 32) that was first received by trading platform 50. Trading order 12 with priority in basic order book 44x may be said to have basic priority. Trading order 12 with priority in special order book 44y may be said to have special priority.

In some embodiments, memory 36 may comprise rules 42 associated with order books 44. In particular, memory 36 may comprise basic rules 42x associated with basic order books 44x and special rules 42y associated with special order books 44y. Basic rules 42x generally comprise rules 42 for processing basic orders 12x and executing trades among basic traders 22x. Special rules 42y generally comprise rules 42 for processing special orders 12y and executing trades among special traders 22y. Basic rules 42x and special rules 42y may comprise any suitable instructions, guidelines, directives, and/or criteria for routing, matching, and/or executing trading orders 12. Special rules 42y and basic rules 42x may further comprise instructions, guidelines, directives, and/or criteria for generating and/or disclosing market data 24.

In some embodiments, special rules 42y may be different from basic rules 42x. For example, a particular special rule 42y may be that, if discretion range 18 associated with order 12a crosses discretion range 18 associated with counterorder 12b, then processor 38 should execute the trade at midpoint price 56 of the intersection range 58. In contrast, a particular basic rule 42x may be that, if discretion range 18 associated with a resting order 12a crosses discretion range 18 associated with counterorder 12b, then processor 38 should execute the trade at limit price 54 or base price 32 of the resting order 12a.

As another example, special rules 42y may comprise a first rule that allows processor 38 to execute a trade at a price comprising a fractional pip value 16. In contrast, basic rules 42x may comprise a second rule that, if trading order 12 is associated with fractional pip value 16, processor 38 should round base price 32 to the nearest whole pip value and should execute the trade at a whole pip price. Thus, basic rules 42x may be different from special rules 42y. As a result, trades between special traders 22y may be executed differently than trades among basic traders 22x.

It should be understood that the special rules 42y described above may, in some embodiments, be basic rules 42x and the basic rules 42x described above may, in some embodiments, be special rules 42y. It should be further understood that special rules 42y and basic rules 42x may comprise any number and combination of suitable rules, instructions, and/or criteria for the routing, processing, and matching of trading orders 12 and/or the disclosure of market data 24.

As explained above, trading platform 50 may store a particular flex order 12z from flex trader 22z in both basic order book 44x and special order book 44y. In some embodiments, if the particular flex order 12z matches a particular special counterorder 12b in special order book 44y, processor 38 may execute the trade with flex order 12z and special counterorder 12b according to special rules 42y. According to certain embodiments, if the particular flex order 12z matches a particular basic counterorder 12b in basic order book 44x, processor 38 may execute the trade with flex order 12z and basic counterorder 12b according to basic rules 42x. In some embodiments, if the particular flex order 12z matches a particular flex counterorder 12z, processor 38 may execute the trade with flex order 12z and flex counterorder 12z according to special rules 42y or basic rules 42x.

An example illustrates certain embodiments. In this example, trading system 10 is configured to prevent trades between special traders 22y and basic traders 22x. Processor 38 receives from basic trader 22x a basic bid for Trading Product X with base price 32 of $8. Processor 38 stores the basic bid in basic order book 44x. Processor 38 subsequently receives from special trader 22y a special offer of Trading Product X with base price 32 of $8. Processor 38 stores the special offer in special order book 44y. Because trading system 10 is configured to prevent trades between special traders 22y and basic traders 22x, processor 38 does not match the basic bid of $8 with the special offer of $8. Processor 38 subsequently receives from flex trader 22z a flex bid for Trading Product X with base price 32 of $8. Processor 38 stores the flex bid in basic order book 44x and special order book 44y. Processor 38 scans special order book 44y and determines that the flex bid of $8 matches the special offer of $8. Processor 38 then executes a trade between the flex bid of $8 from special order book 44y the special offer of $8 from special order book 44y. In conjunction with executing the trade, processor 38 deletes the flex bid of $8 from basic order book 44x.

Although the foregoing example illustrates base prices 32 expressed in dollars, it should be understood that trading system 10 may receive and process trading orders 12 associated with any number and combination of suitable trading products.

In operation, processor 38 is operable to receive basic orders 12x from basic traders 22x, special orders 12y from special traders 22y, and flex orders 12z from flex traders 22z. Upon receiving basic order 12x, processor 38 may store basic order 12x in basic order book 44x in memory 36. Upon receiving special order 12y, processor 38 may store special order 12y in special order book 44y in memory 36. Upon receiving flex order 12z, processor 38 may store flex order 12z in basic order book 44x and special order book 44y. Memory 36 in trading platform 50 may comprise basic rules 42x associated with basic order books 44x and special rules 42y associated with special order books 44y.

According to certain embodiments, trading platform 50 may subsequently receive counterorder 12b. If counterorder 12b is from basic trader 22x, trading platform 50 may match counterorder 12b with basic orders 12x and/or flex orders 12z in basic order book 44x. If counterorder 12b is from basic trader 22x and is matched with flex order 12z in basic order book 44x, trading platform 50 may delete the corresponding flex order 12z from special order book 44y.

In some embodiments, if counterorder 12b is from special trader 22y, trading platform 50 may match counterorder 12b with special orders 12y and/or flex orders 12z in special order book 44y. If counterorder 12b is from special trader 22y and is matched with flex order 12z in special order book 44y, trading platform 50 may delete the corresponding flex order 12z from basic order book 44x.

According to certain embodiments, if counterorder 12b is from flex trader 22z, trading platform 50 may match counterorder 12b with special orders 12y and/or flex orders 12z in special order book 44y. If special order book 44y does not comprise any matching trading orders 12, then trading platform 50 may match counterorder 12b from flex trader 22z with basic orders 12x in basic order book 44x. If counterorder 12b is from flex trader 22z and is matched with flex order 12z in special order book 44y, trading platform 50 may delete the corresponding flex order 12z from basic order book 44x.

Figure 10B:
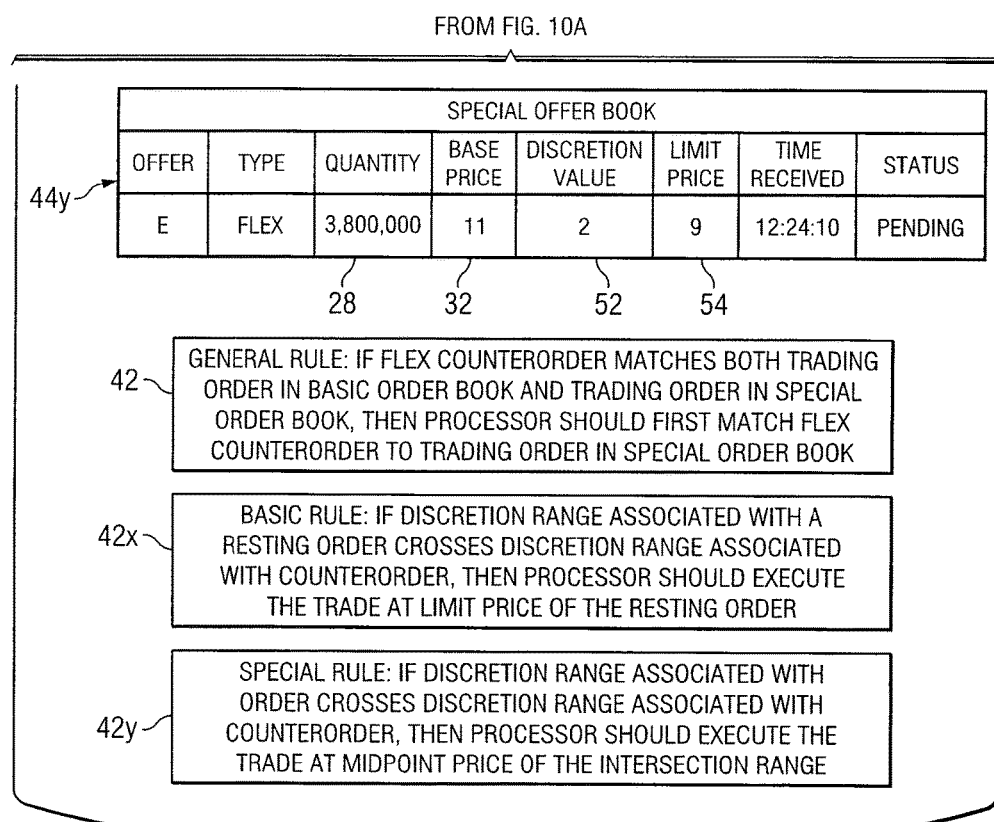
FIG. 10 illustrates a memory comprising example basic order books and example special order books, according to certain embodiments.

FIG. 10 illustrates memory 36 comprising example basic order books 44x and example special order books 44y, according to certain embodiments. In this example, memory 36 comprises special rule 42y that, if discretion range 18 associated with order 12a crosses discretion range 18 associated with counterorder 12b, then processor 38 should execute the trade at midpoint price 56 of the intersection range 58. Memory 36 further comprises basic rule 42x that, if discretion range 18 associated with a resting order 12a crosses discretion range 18 associated with counterorder 12b, then processor 38 should execute the trade at limit price 54 of the resting order 12a. In this example, memory 36 further comprises a general rule 42 that, if flex counterorder 12b matches both trading order 12 in basic order book 44x and trading order 12 in special order book 44y, then processor 38 should first match flex counterorder 12b to trading order 12 in special order book 44y.

In this example, processor 38 receives at 12:24:02 Basic Bid A associated with quantity 28 of 100,000 units. Basic Bid A is associated with base price 32 of $8 and discretion value 52 of $3. Processor 38 stores Basic Bid A in basic bid book 44x. Processor 38 then receives at 12:24:04 Special Bid B associated with quantity 28 of 500,000 units. Special Bid B is associated with base price 32 of $8 and discretion value 52 of $2. Trading platform 50 stores Special Bid B in special bid book 44y.

At 12:24:06, processor 38 receives Flex Bid C associated with quantity 28 of 500,000 units. Flex Bid C is associated with base price 32 of $8 and discretion value 52 of $2. Processor 38 stores Flex Bid C in both special bid book 44y and basic bid book 44x. Processor 38 subsequently receives Basic Bid D associated with quantity 28 of 100,000 units. Basic Bid D is associated with base price 32 of $8 and discretion value 52 of $2. Processor 38 stores Basic Bid D in basic bid book 44x.

In this example, processor 38 then receives Flex Offer E associated with quantity 28 of 5,000,000 units. Flex Offer E is associated with base price 32 of $11 and discretion value 52 of $2. Upon receiving Flex Offer E, processor 38 determines that discretion range 18 of Flex Offer E crosses discretion range 18 of each of Basic Bid A, Special Bid B, Flex Bid C, and Basic Bid D. Processor 38 further determines that Special Bid B is associated with special priority in special bid book 44y and that Basic Bid A is associated with basic priority in basic bid book 44x.

As explained above, memory 36 comprises a general rule 42 that, if flex counterorder 12b matches both trading order 12 in basic order book 44x and trading order 12 in special order book 44y, then processor 38 should first match flex counterorder 12b to trading order 12 in special order book 44y. Accordingly, processor 38 first matches Special Bid B to Flex Offer E. According to special rule 42y in memory 36, processor 38 executes the trade at midpoint price 56 of $9.50.

After matching Special Bid B to Flex Offer E, processor 38 determines that a portion (4,500,000 units) of Flex Offer E remains unfilled. According to the general rule 42, processor 38 then matches Flex Bid C in special bid book 44y with Flex Offer E. According to special rule 42y in memory 36, processor 38 executes the trade at midpoint price 56 of $9.50. In conjunction with executing the trade, processor 38 deletes Flex Bid C from basic bid book 44x.

After matching Flex Bid C to Flex Offer E, processor 38 determines that a portion (4,000,000 units) of Flex Offer E remains unfilled. Because special bid book 44y comprises no more matching trading orders 12, processor 38 then matches Basic Bid A in basic bid book 44x with Flex Offer E. According to basic rule 42x in memory 36, processor 38 executes the trade at $11—limit price 54 of Basic Bid A.

After matching Basic Bid A to Flex Offer E, processor 38 determines that a portion (3,900,000 units) of Flex Offer E remains unfilled. Processor 38 then matches Basic Bid D in basic bid book 44x with Flex Offer E. According to basic rule 42x in memory 36, processor 38 executes the trade at $10—limit price 54 of Basic Bid D. Processor 38 then determines that basic bid book 44x comprises no more matching trading orders 12. Accordingly, processor 38 stores the remaining portion (3,800,000 units) of Flex Offer E in both basic offer book and special offer book.

Although the foregoing example illustrates base prices 32 expressed in dollars, it should be understood that trading system 10 may receive and process trading orders 12 associated with any number and combination of suitable trading products.

The foregoing example illustrates special rules 42y and basic rules 42x for matching trading orders 12 comprising discretion values 52. It should be understood, however, that basic rules 42x and special rules 42y may comprise any suitable instruction, criteria, and/or logic associated with any number and combination of characteristics of trading orders 12.

The invention has several important technical advantages. Various embodiments of the invention may have none, some, or all of these advantages. One advantage is that trading system 10 may process trading orders 12 from a particular group 72 of traders 22 according to a particular set of rules 42 and may process trading orders 12 from another group 42 of traders 22 according to a different set of rules 42. In some embodiments, trading system 10 may prevent trading between different types of traders 22. Thus, trading system 10 may allow traders 22 to avoid trading with counterparties that are perceived to be a nuissance or to have an unfair advantage.

Figure 11:
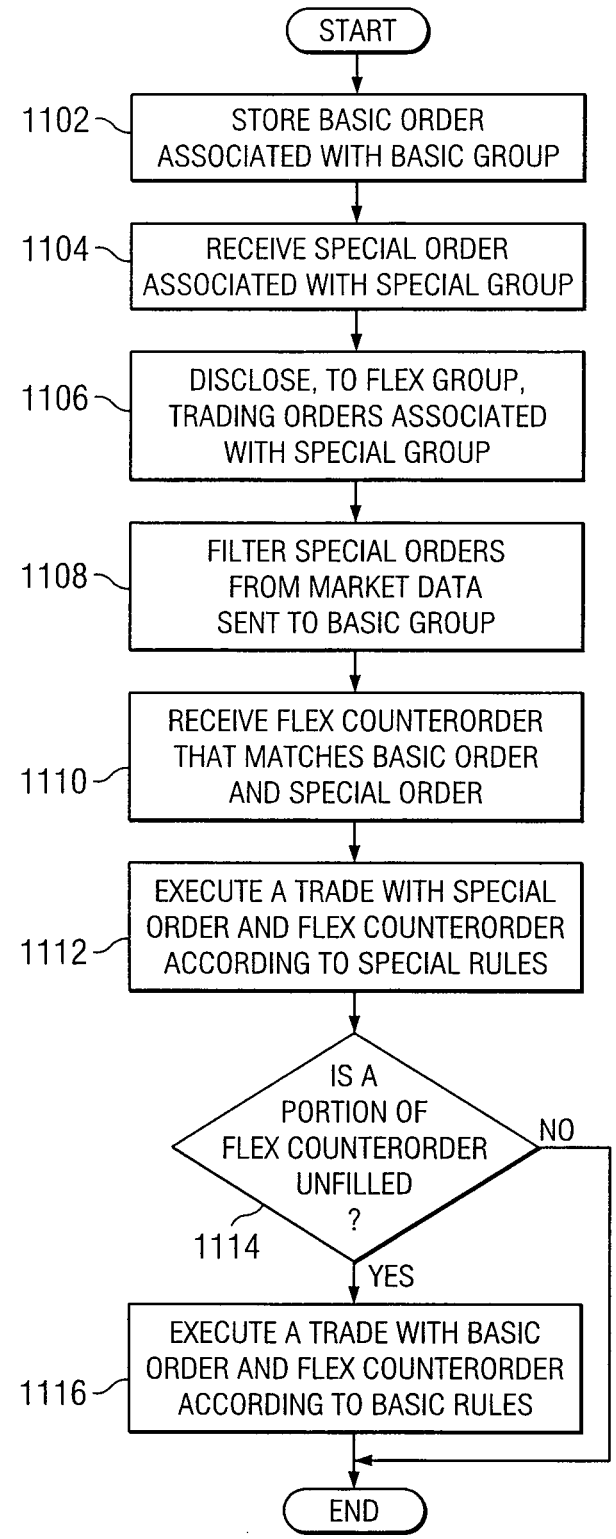
FIG. 11 illustrates a flowchart for managing trading orders, according to certain embodiments.

FIG. 11 illustrates a flowchart for managing trading orders 12, according to certain embodiments. The method begins at step 1102 by storing in basic order book 44x a particular basic order 12x from basic trader 22x. At step 1104, processor 38 receives special order 12y from special trader 22y. Processor 38 may store special order 12y in special order book 44y in memory 36. At step 1106, processor 38 and/or market data server 60 may generate market data 24 based at least in part on trading orders 12 in basic order book 44x and special order book 44y. Processor 38 and/or market data server 60 may transmit to clients 20 associated with flex traders 22z market data 24 comprising information regarding special orders 12y, flex orders 12z, and basic orders 12x in order books 44 in memory 36. At step 1108, processor 38 and/or market data server 60 may filter, from market data 24 sent to basic traders 22x, information regarding special orders 12y in special order book 44y.

At step 1110, processor 38 receives from flex trader 22z a particular flex counterorder 12b that matches the stored basic order 12x and the received special order 12y. At step 1112, processor 38 executes a trade associated with the received special order 12y and the received flex counterorder 12b. The trade may be executed according to special rules 42y. At step 1114, processor 38 determines whether any portion of flex counterorder 12b is unfilled. If processor 38 determines at step 1114 that all of flex counterorder 12b has been filled, the method then ends. If, however, processor 38 determines at step 1114 that a portion of flex counterorder 12b is unfilled, then at step 1116 processor 38 may execute a trade associated with the received basic order 12x and the unfilled portion of flex counterorder 12b. This trade may be executed according to basic rules 42x in memory 36. The method then ends.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system for managing trading orders in an electronic trading system over a network with graphical user interfaces of computing devices, the system comprising:
   at least one processor of a computing device of an electronic trading system, and
   at least one memory device communicatively coupled to the at least one processor of the computing device of the electronic trading system, in which the at least one memory device stores instructions which, when executed by the at least one processor of the computing device of the electronic trading system, direct the at least one processor of the computing device of the electronic trading system to:
   receive, from an input portion of a graphical user interface of a computing device of a trader, data representing a first order associated with a particular trading product, wherein the first order comprises a request to fill the first order at a first price comprising a non-zero fractional pip value;
   determine whether the first price of the first order comprises a fractional pip value;
   in response to determining that the first price of the first order comprises a fractional pip value, determine whether the first order satisfies at least one configurable threshold condition stored in the at least one memory device of the computing device of the electronic trading system;
   in response to determining that the first order satisfies the at least one configurable threshold condition, the computing device of the electronic trading system to causing to apply a filter to the first price of the first order to:
   (a) allow transmission of the first price of the first order including a root value and the fractional pip value of the market data to the computing device of the trader, and allow display of the first price of the first order including the root value and the fractional pip value of the market data on a trade history display portion of the graphical user interface of the computing device of the trader,
   (b) allow transmission of the root value of the market data, but not the fractional pip value of market data, to computing devices of a plurality of traders, and allow display of the root value of the market data, but not fractional pip value of the market data, on the market data display portions of graphical user interfaces of the computing devices of the plurality of the traders;
   after causing the first price of the first order to be displayed without the fractional pip value to a plurality of traders, receive, from an input portion of a graphical user interface of a computing device of one of the plurality of traders, data representing a second order associated with the particular trading product, wherein the second order is contra to the first order, wherein the second order comprises a request to fill the second order at a second price, wherein the second price of the second order matches the first price of the first order;
   after receiving the second order, determine that the second price of the second order matches the first price of the first order;

apply a sequencing order to the first order and the second order to remove suggestion of market priority of the first order and the second order;

redisplay the sequenced first order and the second order to the graphical user interface of the computing devices of the plurality of the traders;

cause to display, data representing trading orders submitted by the plurality of the traders, on a trade history viewer portion of the graphical user interfaces of the computing devices of the plurality of the traders;

cause to display, data representing market data including information regarding trading orders in order books from memory, on a market data viewer portion of the graphical user interfaces of the computing devices of the plurality of the traders; and in response to determining that the second price of the second order matches the first price of the first order, execute a trade associated with the first order and the second order, wherein the trade is executed at the first price.

2. The system of claim 1, in which the act of determining whether the first order satisfies the at least one configurable threshold condition comprises determining whether a quantity of the first order satisfies a quantity threshold value of the particular trading product.

3. The system of claim 1, wherein the market data is transmitted to one or more users, and in which the first order is configured to be filled only at the first price and not at any other price.

4. The system of claim 1, wherein the second price of the second order consists of a whole pip price that does not have a fractional pip value, and in which the act of determining whether the first order satisfies the at least one configurable threshold condition comprises determining whether the second order satisfies a minimum volume requirement.

5. The system of claim 1, wherein the second order further comprises an instruction to execute a trade at the first price of the first order.

6. The system of claim 1, further comprising displaying the market data on a monitor of one or more users in a random sequence.

7. The system of claim 1, further comprising storing the first order in an order stack in response to determining that the first price of the first order does not comprise the fractional pip value.

8. The system of claim 1, further comprising rejecting the first order in response to determining that the first order fails to satisfy the at least one configurable threshold condition stored in the at least one memory device.

9. A method for managing trading orders in an electronic trading system over a network with graphical user interfaces of computing devices, the method comprising:

receiving, by a processor of a computing device of an electronic trading system, from an portion of a graphical user interface of a computing device, data representing a first order associated with at least one trading product, the first order comprising a request to fill the first order only at a first price comprising a non-zero fractional pip value;

determining, by the processor of the computing device of the electronic trading system, whether the first price of the first order comprises a fractional pip value;

in response to determining that the first price of the first order comprises the fractional pip value, determining, by the processor of the computing device of the electronic trading system, whether the first order satisfies at least one configurable threshold condition stored in the at least one memory device;

in response to determining that the first order satisfies the at least one configurable threshold condition, causing, by the at least one processor of the computing device of the electronic trading system, to apply a filter to the first prices of the first order to:

(a) allow transmission of the first price of the first order including a root value and the fractional pip value of the market data to the computing device of the trader, and allow display of the first price of the first order including the root value and the fractional pip value of the market data on a trade history display portion of the graphical user interface of the computing device of the trader, (b) allow transmission of the root value of the market data, but not the fractional pip value of market data, to computing devices of a plurality of traders, and allow display of the root value of the market data, but not fractional pip value of the market data, on the market data display portions of graphical user interfaces of the computing devices of the plurality of the traders;

after causing the first price of the first order to be displayed without the fractional pip value to a plurality of traders, receiving, by the processor of the computing device of the electronic trading system, from an input portion of a graphical user interface of a computing device of one of the plurality of traders, data representing a second order associated with the at least one trading product, the second order being contra to the first order, and the second order comprising a request to fill the second order at a second price;

after receiving the second order, determining, by the processor of the computing device of the electronic trading system, that the second price of the second order matches the first price of the first order;

applying a sequencing order to the first order and the second order to remove suggestion of market priority of the first order and the second order;

redisplaying the sequenced first order and the second order to the graphical user interface of the computing devices of the plurality of the traders;

causing to display, data representing trading orders submitted by the plurality of the traders, on a trade history viewer portion of the graphical user interfaces of the computing devices of the plurality of the traders;

causing to display, data representing market data including information regarding trading orders in order books from memory, on a market data viewer portion of the graphical user interfaces of the computing devices of the plurality of the traders; and in response to determining that the second price of the second order matches the first price of the first order, executing, by the processor of the computing device of the electronic trading system, a trade associated with the first order and the second order, the trade being executed at the first price.

10. The method of claim 9, in which the act of determining whether the first order satisfies the at least one configurable threshold condition comprises determining whether a quantity of the first order satisfies a quantity threshold value of the particular trading product.

11. The method of claim 9, wherein the second price comprising the act of suppressing the fractional pip value in the market data by masking the fractional pip value such that recipients of the market data are unable to identify the fractional pip value of the first price of the first order.

12. The method of claim 9, wherein the second price consists of a whole pip price that does not have a fractional pip value, and
   wherein the act of determining whether the first order satisfies the at least one configurable threshold condition comprises determining whether the second order satisfies a minimum volume requirement.

13. The method of claim 9, further comprising displaying the transmitted market data on a monitor of one of more users in a random sequence.

14. The method of claim 9, wherein suppressing the fractional pip value comprises filtering, by the processor, the fractional pip value from market data transmitted to a client.

15. The system of claim 1, further directing the at least one processor to store the first order in the order book in response to determining that that the first order satisfies the at least one configurable threshold condition.

16. The system of claim 4, wherein suppressing the fractional pip value results in preventing recipients from receiving the fractional pip value in the market data.

17. The method of claim 9, further comprising storing the first order in the order book in response to determining that that the first order satisfies the at least one configurable threshold condition.

18. The method of claim 11, wherein suppressing the fractional pip value results in preventing recipients from receiving the fractional pip value in the market data.

19. A non-transitory machine-readable medium having instructions stored thereon for managing trading orders in an electronic trading system over a network with graphical user interfaces of computing devices, the instructions which, when executed by at least one processor of a computing device of a electronic trading system, direct the at least one processor of the computing device of the electronic trading system to:
   receive, from an input portion of a graphical user interface of a computing device of a trader, data representing a first order associated with a particular trading product, wherein the first order comprises a request to fill the first order only at a first price comprising a non-zero fractional pip value, in which the first order is configured to be filled only at the first price and not at any other price;
   determine whether the first price of the first order comprises a fractional pip value;
   in response to determining that the first price of the first order comprises a fractional pip value, determine whether the first order satisfies at least one configurable threshold condition stored in the at least one memory device;
   in response to determining that the first order satisfies the at least one configurable threshold condition, causing to apply a filter to the first price of the first order to:
      (a) allow transmission of the first price of the first order including a root value and the fractional pip value of the market data to the computing device of the trader, and allow display of the first price of the first order including the root value and the fractional pip value of the market data on a trade history display portion of the graphical user interface of the computing device of the trader,
      (b) allow transmission of the root value of the market data, but not the fractional pip value of market data, to computing devices of a plurality of traders, and allow display of the root value of the market data, but not fractional pip value of the market data, on the market data display portions of graphical user interfaces of the computing devices of the plurality of the traders;
   after the act of causing the first price of the first order to be displayed without the fractional pip value to a plurality of traders, receive from an input portion of a graphical user interface of a computing device from one of the plurality of traders a second order associated with the particular trading product, wherein the second order is contra to the first order, wherein the second order comprises a request to fill the second order at a second price, wherein the second price of the second order matches the first price of the first order;
   after the act of receiving the second order, determine that the second price of the second order matches the first price of the first order;
   apply a sequencing order to the first order and the second order to remove suggestion of market priority of the first order and the second order;
   redisplay the sequenced first order and the second order to the graphical user interface of the computing devices of the plurality of the traders;
   cause to display, data representing trading orders submitted by the plurality of the traders, on a trade history viewer portion of the graphical user interfaces of the computing devices of the plurality of the traders;
   cause to display, data representing market data including information regarding trading orders in order books from memory, on a market data viewer portion of the graphical user interfaces of the computing devices of the plurality of the traders; and
   in response to determining that the second price of the second order matches the first price of the first order, execute a trade associated with the first order and the second order, wherein the trade is executed at the first price.

20. The non-transitory machine-readable medium of claim 19, in which the act of determining whether the first order satisfies the at least one configurable threshold value comprises determining a quantity threshold value of the particular trading product.

\* \* \* \* \*